(12) United States Patent
Cossock

(10) Patent No.: US 6,226,629 B1
(45) Date of Patent: May 1, 2001

(54) METHOD AND APPARATUS DETERMINING AND USING HASH FUNCTIONS AND HASH VALUES

(75) Inventor: David Cossock, Berkeley, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/034,216

(22) Filed: Feb. 28, 1998

Related U.S. Application Data

(60) Provisional application No. 60/038,548, filed on Feb. 28, 1997, and provisional application No. 60/045,284, filed on Apr. 30, 1997.

(51) Int. Cl.[7] ............................................. G06F 17/30
(52) U.S. Cl. ...................................... 707/3; 707/7
(58) Field of Search ..................... 707/3–6, 7, 200, 707/204, 100–101; 380/28, 29, 21, 25, 42–44; 713/200–202

(56) References Cited

U.S. PATENT DOCUMENTS

| | | | |
|---|---|---|---|
| 5,032,987 | * | 7/1991 | Broder et al. ............................ 707/1 |
| 5,204,966 | * | 4/1993 | Wittenberg et al. .................. 713/202 |
| 5,633,858 | * | 5/1997 | Chang et al. .......................... 370/255 |
| 5,778,395 | * | 7/1998 | Whitting et al. ...................... 707/204 |
| 5,802,521 | * | 9/1998 | Ziauddin et al. ..................... 707/101 |
| 5,949,884 | * | 9/1999 | Adams et al. .......................... 380/29 |
| 5,950,185 | * | 9/1999 | Alon et al. ............................... 707/1 |

OTHER PUBLICATIONS

"Security in Computing," Pfleeger, Charles Second Edition, Prentice Hall, 1996, Chapter 3, pp. 101–110, Chapter 4, pp. 169–170, p. 552, Apr. 1996.*

Abstract, Wigderson, A., "The Amazing Power of Pairwise", Institute for Computer Science Hebrew, pp. 1–2, Jul. 1, 1977, Jerusalem, Israel.

Blellock, G. E. et al.; A Comparison of Sorting Algorithms for the Connection Machine CM–2; pp. 1–30, date unknown.

Abstract, Wigderson, A., "The Amazing Power of Pairwise", Institute for Computer Science Hebrew, pp. 1–2, Jul. 1, 1977, Jerusalem, Israel.

Morton M. Astrahan, Mario Schkolnick and Kyu–Young Whang, "Approximating the Number of Unique Values of an Attribute Without Sorting," Information Systems, vol. 12, No. 1, 1987, pp. 11–15.

Philippe Flajolet and G. Nigel Martin, "Probabilistic Counting Algorithms for Data Base Applications," Journal of Computer and System Sciences, vol. 31, 1985, pp. 182–209.

Philippe Flajolet and G. Nigel Martin, "Probabilistic Counting," 24th Annual Symposium on Foundations of Computer–Science, Nov. 7–9, 1983, pp. 76–82.

Kyu–Young Whang, Brad T. Vander–Zanden and Howard M. Taylor, "A Linear–Time Probabilistic Counting Algorithm for Database Applications," ACM Transactions on Database Systems, vol. 15, No. 2, Jun. 1990, pp. 208–229.

Samuel S. Wilks, "Mathematical Statistics," John Wiley & Sons, Inc., Sec. 9.3., pp. 259 and 260. Date Unknown.

S. Seshadri and Jeffrey F. Naughton, "Sampling Issues in Parallel Database Systems," 3rd International Conference on Extending Database Technology, Springer–Verlag, Mar. 23–27, 1992, pp. 328–343.

(List continued on next page.)

*Primary Examiner*—Hosain T. Alam
(74) *Attorney, Agent, or Firm*—Fenwick & West LLP

(57) ABSTRACT

A method and apparatus that determines and uses two nearly uniform independent hash functions. The hash functions are created using only linear arithmetic and 4-byte machine register operations and, thus, can be created very quickly. The first uniform hashing function hi and the second uniform hashing function h2 are pairwise independent;

27 Claims, 11 Drawing Sheets

Hashing an item

OTHER PUBLICATIONS

Jeffrey Scott Vitter, "Optimum Algorithms for Two Random Sampling Problems," 24th Annual Symposium on Foundations of Computer Science, Nov. 7–9, 1983, pp. 65–75.

Alan Siegel and Jeanette P. Schmidt, "Closed Hashing is Computable and Optimally Randomizable with Universal Hash Functions," New York State Science and Technology Foundation Center through its Center for Advanced Technology, pp. 1–40. Date Unknown.

J. Lawrence Carter and Mark N. Wegman, "Universal Classes of Hash Functions," Journal of Computer and System Sciences, vol. 18, 1979, pp. 143–154.

Mark N. Wegman and J. Lawrence Carter, "New Hash Functions and Their Use in Authentication and Set Equality," Journal of Computer and System Sciences, vol. 22, 1981, pp. 265–279.

Michael L. Fredman and Janos Komlos, "Storing a Sparse Table with o(1) Worst Case Access Time," Journal of the Association for Computing Machinery, vol. 31, No. 3, Jul. 1984, pp. 538–544.

Avi Wigderson, "Lectures on the Fusion Method and Derandomization," Technical Report SOCS–95.2. McGill University, School of Computer Science, Jan. 28–Feb. 3, 1994, pp. 1–55.

M. Dietzfelbinger, J. Gil, Y. Matias and N. Pippenger, "Polynomial Hash Functions Are Reliable," 19th International Colloquium, Springer–Verlag, Jul. 13–17, 1992, pp. 235–246.

Martin Dietzfelbinger and Friedhelm Meyer auf der Heide, "A New Universal Class of Hash Functions and Dynamic Hashing in Real Time," 17th International Colloquium, Springer–Verlag, Jul. 16–20, 1990, pp. 6–19.

M. Dietzfelbinger, A. Karlin, K. Mehlhorn, F. Meyer auf der Heide, H. Rohnert and R.E. Tarjan, "Dynamic Perfect Hashing: Upper and Lower Bounds," 29th Annual Symposium on Foundations of Computer Science, Oct. 24–26, 1988, pp. 524–531.

Jeanette P. Schmidt, Alan Siegel and Aravind Srinivasan, "Chernoff–Hoeffding Bounds for Applications with Limited Independence," Department of Computer Science, Cornell University, Oct. 1992, pp. 1–28.

George S. Lueker and Mariko Molodowitch, "More Analysis of Double Hashing," 20th Annual ACM Symposium on Theory of Computing, May 2–4, 1988, pp. 354–359.

J. Bunge and M. Fitzpatrick, "Estimating the Number of Species: A Review," Journal of the American Statistical Association, vol. 88, No. 421, Mar. 1993, pp. 364–373.

John A. Bunge and John C. Handley, "Sampling to Estimate the Number of Duplicates in a Database," Computational Statistics & Data Analysis 11, 1991, pp. 65–74.

Peter J. Haas, Jeffrey F. Naughton, S. Seshardri and Lynne Stokes, "Sampling–Based Estimation of the Number of Distinct Values of an Attribute," Proc. 21st International Conference on Very Large Data Bases, Sep. 11–15, 1995, pp. 311–322.

J. Aitchison and J.A.C. Brown, "The Lognormal Distribution," Cambridge at the University Press, 1957, Chapter 2, pp. 7–19.

Peter Kirschenhofer and Helmut Prodinger, "On The Analysis of Probabilistic Counting," Number–Theoretic Analysis, LNCS 1452, (Berlin: Springer–Verlag), Vienna 1988–89, pp. 117–120.

P. Flajolet, "On Adaptive Sampling," Computing 34, 1990, pp. 391–400.

Norman L. Johnson, Samuel Kotz, N. Balakrishnan, "Continuous Univariate Distributions," (New York: John Wiley & Sons, Second Edition), vol. 1, Ch. 14, pp. 207–258 Date Unknown.

Venky Harinarayan, Anand Rajaraman and Jeffrey D. Ullman, "Implementing Data Cubes Efficiently," 1996 International Conference on Management of Data—SIGMOD 96 (ACM: Jun. 4–6, 1996), vol. 25, Issue 2, pp. 205–216.

* cited by examiner

Tables in a Relational Database

Probabilistic Counting

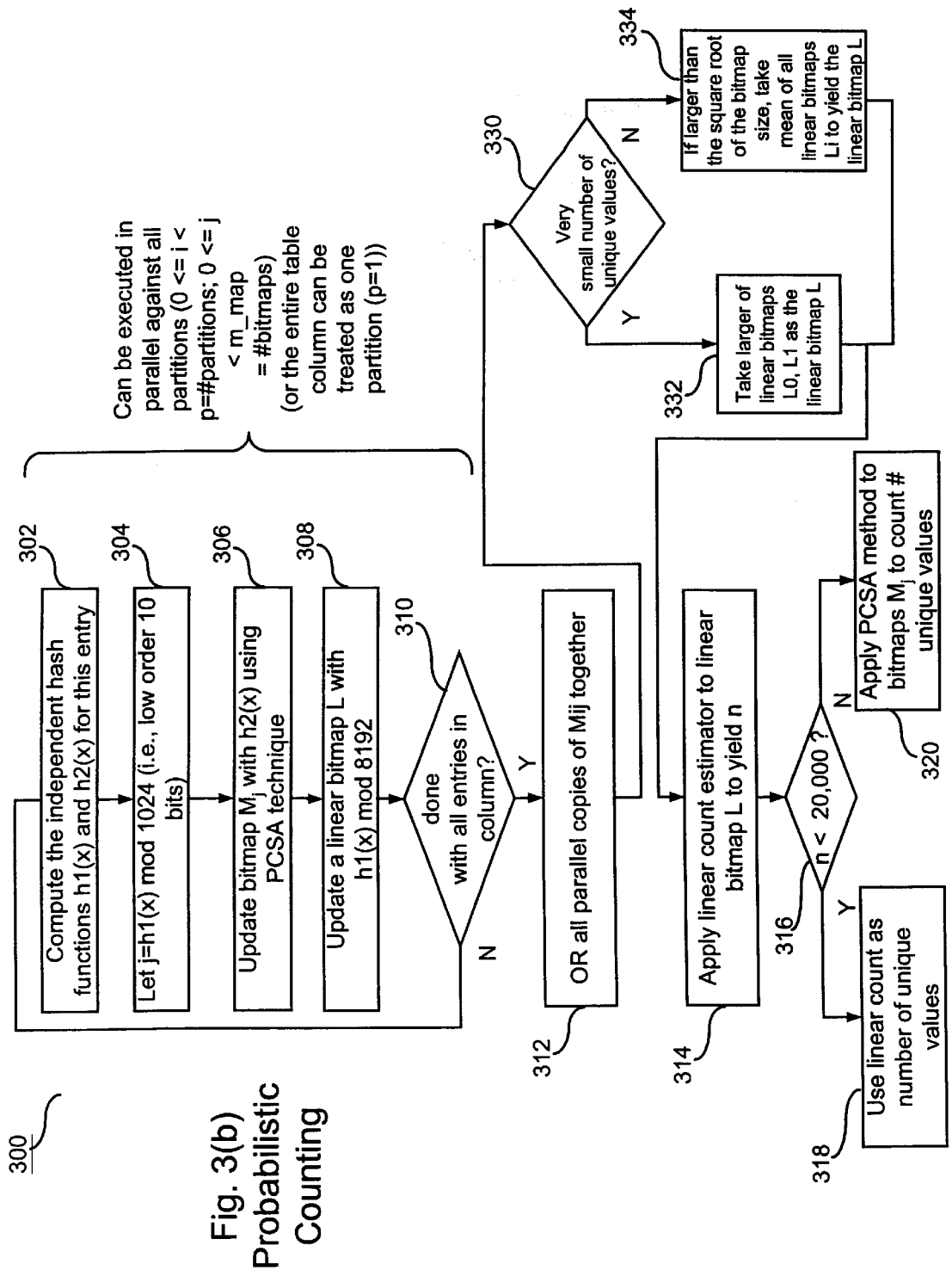
Fig. 3(b) Probabilistic Counting

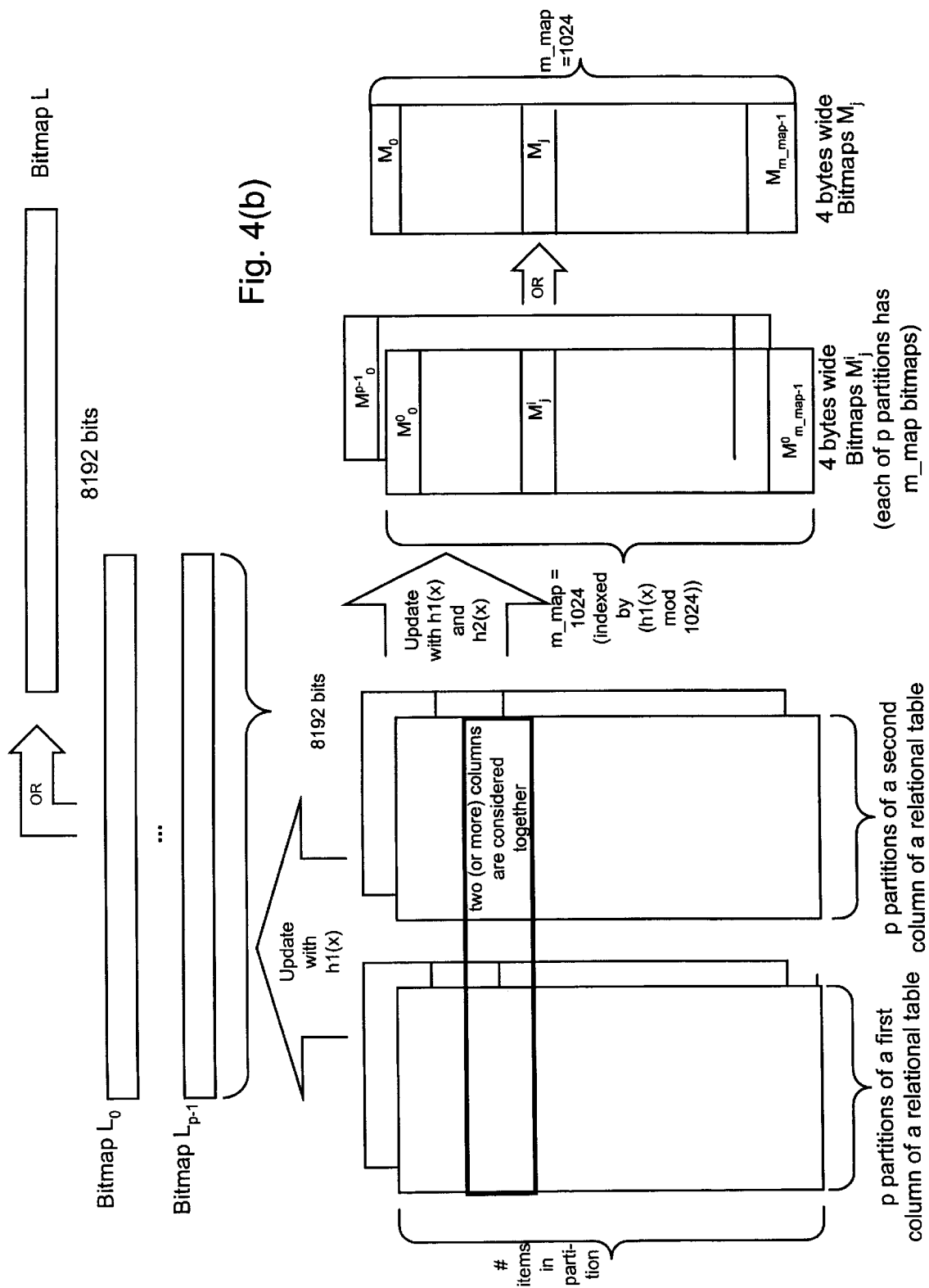

Hashing an item

| m_map | Bias | Std. Eror (%) |
|---|---|---|
| 2 | 1.1662 | 61.0 |
| 4 | 1.0792 | 40.9 |
| 8 | 1.0386 | 28.2 |
| 16 | 1.0191 | 19.6 |
| 32 | 1.0095 | 13.8 |
| 64 | 1.0047 | 9.7 |
| 128 | 1.0023 | 6.8 |
| 256 | 1.0011 | 4.8 |
| 512 | 1.0005 | 3.4 |
| 1024 | 1.0003 | 2.4 |

Fig. 6

| Dataset | N | Length | Descriptions |
|---|---|---|---|
| T1 | 1M | 66 | 3 random ascii words from /usr/dict (22 bytes 1-justified) |
| T1 | 1M | 15 | 3 random ascii 5-digit strings |
| T2 | 100k | 24 | strings of ascii letters chosen with very unequal probabilities |
| T3 | 100k | 4 | random 32-bit binary ints |
| T5 | 53795 | 8 | workload address trace - ascii |
| T6 | 53795 | 4 | address trace - binary |
| T7 | 100k | 16 | random packed decimal with leading zeroes |
| T8 | 100k-3 billion | 4 | binary integers 1-n |
| T10 | 100k | 20 | ascii 0's & 1's -uniform dist. |
| T11 | 100k | 12 | similar to T2 with leading blanks |
| T12 | 100k | 24 | heavily biased (unequal prob.) ascii digits |
| T18 | 100k | 8 | ascii digits 900k-1M w/leading 0 |
| T19 | 100k | 80 | random bits - 1 bit per fullword |

Fig. 7

| Type (N_tst) | N (Dist.) | Mean Std. Error | Min Std. Error | Max Std. Error | Mean Err (%) | Min Err | Max Err |
|---|---|---|---|---|---|---|---|
| Lin 50 | 16 | .933 | .599 | 1.47 | .127 | .004 | .25 |
| PC 50 | 19 | 2.32 | 1.16 | 2.83 | .278 | .03 | .672 |
| PC 5k | 17 | 2.398 | 2.34 | 2.49 | .033 | 6.4E-4 | .08 |

Fig. 8

| Dataset | Keylen | Distinct | Std. Err (%) | Err (%) | N-test |
|---|---|---|---|---|---|
| T10 | 20 | 95423 | 2.83 | .672 | 50 |
| T12 | 24 | 95227 | 2.36 | .214 | 50 |
| T2 | 12 | 100000 | 2.17 | .156 | 50 |
| T2 | 12 | 100000 | 2.76 | .423 | 50 |
| T1 | 36 | 99977 | 2.44 | .137 | 50 |
| T1 | 8 | 99800 | 2.38 | .389 | 50 |
| T1 | 15 | 1M | 2.51 | .433 | 50 |
| T7 | 12 | 63225 | 1.97 | .062 | 50 |
| T8 | 4 | 100000 | 1.90 | .615 | 50 |
| T9 | 4 | 63125 | 2.73 | .326 | 50 |
| T11 | 10 | 99983 | 2.33 | .390 | 50 |
| T14 | 4 | 100000 | 2.53 | .238 | 50 |
| T1 | 66 | 1M | 2.10 | .547 | 50 |
| T5 | 8 | 53795 | 2.34 | .202 | 50 |
| T6 | 4 | 53795 | 2.58 | .065 | 50 |
| T3 | 4 | 99999 | 2.49 | .034 | 50 |
| T2 | 12 | 100000 | 2.29 | .218 | 50 |
| T14 | 4 | 500 | .599 | .092 | 50 |
| T12 | 24 | 750 | .753 | .163 | 50 |
| T11 | 10 | 1000 | .881 | .004 | 50 |
| T10 | 20 | 1499 | .700 | .076 | 50 |
| T9 | 4 | 1981 | .832 | .088 | 50 |
| T8 | 4 | 2500 | .714 | .007 | 50 |
| T7 | 12 | 4869 | .653 | .110 | 50 |
| T6 | 4 | 7500 | .844 | .250 | 50 |
| T5 | 8 | 10000 | .913 | .161 | 50 |
| T3 | 4 | 12500 | 1.020 | .184 | 50 |
| T2 | 12 | 15000 | 1.110 | .139 | 50 |
| T1 | 36 | 16000 | .911 | .011 | 50 |
| T1 | 8 | 16994 | 1.21 | .106 | 50 |
| T1 | 66 | 18000 | 1.40 | .092 | 50 |
| T1 | 15 | 19000 | 1.47 | .155 | 50 |
| T1 | 22 | 8303 | .919 | .165 | 50 |
| T1 | 22 | 13788 | 1.16 | .128 | 50 |
| T8 | 4 | 3 billion | 2.30 | .030 | 174 |

Fig. 9

| Dataset | Keylen | Distinct | Std. Err | Err (%) |
|---|---|---|---|---|
| T8 | 4 | 1M | 2.49 | .060 |
| T8 | 4 | 10M | 2.44 | .0077 |
| T14 | 4 | 100000 | 2.38 | .0769 |
| T5 | 8 | 53795 | 2.36 | .0261 |
| T6 | 4 | 53795 | 2.34 | .0046 |
| T7 | 12 | 63225 | 2.41 | .0048 |
| T8 | 4 | 100000 | 2.39 | .0546 |
| T9 | 4 | 63125 | 2.44 | .0364 |
| T2 | 25 | 100000 | 2.34 | .0006 |
| T1 | 36 | 99977 | 2.38 | .0267 |
| T1 | 8 | 99800 | 2.38 | .0184 |
| T12 | 24 | 95226 | 2.45 | .0137 |
| T10 | 20 | 95423 | 2.38 | .0675 |
| T11 | 10 | 99983 | 2.34 | .0421 |
| T1 | 66 | 1M | 2.39 | .0121 |
| T1 | 15 | 1M | 2.43 | .0209 |
| T8 | 4 | 100M | 2.43 | .0800 |
| Mean: | | | 2.398 | .0326 |

TABLE 10

| Distinct | Mapsize | H | $H^3$ | $H^4$ | Predicted | N_test |
|---|---|---|---|---|---|---|
| 19000 | 8192 | 1.255 | 2.08 | 1.239 | 1.247 | 5500 |
| 20000 | 8192 | 1.286 | 2.0337 | 1.294 | 1.284 | 5500 |
| 100,000 | 65536 | .747 | 1.0593 | .742 | .748 | 5500 |

Fig. 11

METHOD AND APPARATUS DETERMINING AND USING HASH FUNCTIONS AND HASH VALUES

This application claims priority under 35 U.S.C. § 119(e) from U.S. Provisional Application No. 60/038,548, filed Feb. 28, 1997, and from U.S. Provisional Application No. 60/045,284, filed Apr. 30, 1997, each of which is hereby incorporated by reference.

BACKGROUND OF THE INVENTION

The concept of "relational databases" is well-known. Relational databases are described generally in Date, *Database Systems*, Addison-Wesley publishing Co. 1986, which is herein incorporated by reference. Relational databases usually include a plurality of tables that are searched ("queried") using a well-known query language, such as the SQL or SQL/MP query languages.

Very large databases can include many large tables. Each of these tables includes a plurality of rows and columns. Because it can become quite time-consuming for the system to perform queries on large database having large tables, the process of "query optimization" becomes quite important in processing queries for large databases. Query optimization is usually performed by the software that will execute the query prior to executing the query.

Query optimization in relational databases relies heavily not only on table size, i.e., rowcount, but also column cardinalities, i.e., total number of distinct values in a column. Some conventional systems employ histograms in the optimization process, determining cardinalities for percentile or other partitions. Other conventional systems rely on cost functions derived primarily from such estimates.

Sorting once per column is a rather costly approach, and on the other hand, mathematical statistics has not succeeded in applying sampling theory to this problem with the usual efficacy.

Probabilistic counting methods can achieve arbitrary accuracy for multi-column histogram/UEC estimates in a single parallel pass with minimal memory requirements. A pre-requisite is a hash function producing uniformly distributed output on all input data sets, where uniform is defined as "yielding a uniform statistical distribution." Conventional systems have not employed a truly uniform hashing function. Thus, probabilistic counting has not yielded sufficiently accurate results based on rigorous tests.

For example, a technique described in by Flajolet involves some non-trivial analytic number theory, is based on the intuition that a uniform hash onto s-bit integers should produce values . . . $10^k$, with probability approximately $2^{-k}$, for k<s (where $0^k$ represents a string of k: consecutive 0's.) The largest such k can be used to estimate log2(n). (See Flajolet et al, "Probabilistic Counting Algorithms for Database Applications," Journal of Computer and System Sciences, Vol. 31, No. 2, October 1985, pp. 182–209; Flajolet et al., "Probabilistic Counting," Proc. 24th Annual Symposium on the Foundations of Computer Science," (IEEE) November 1983, pp. 76–82; and Flajolet, "On Adaptive Sampling," Computing 34, pp. 391–408, each of which is herein incorporated by reference).

Each successive hash value is accordingly examined to determine the rightmost 1-bit, whose position is recorded by OR'ing a bitmap of size $m=2^s$. At the conclusion of the run, the bitmap will have the form . . . $01^R$, and the expected value of R is proven to be $$E(R)=\log2(\phi n),$$

where $\phi=0.77351$ is analytically determined, with a standard deviation $\sigma_R=1.12$ (bits).

To reduce the expected error (which would exceed a factor of 2), an appeal is made to the central limit theorem, which, as the basis of sampling theory, asserts that for estimators based on summation sampling variance decreases by a factor of N as sample sizes increase by the same amount, and that sampling distributions tend towards normality. (Without such guarantees, the association of a probability of error with a standard deviation would be practically meaningless).

SUMMARY OF THE INVENTION

The described embodiment of the present invention introduces the creation and use of two nearly uniform independent hash functions. The hash functions are created using only linear arithmetic and 4-byte machine register operations and, thus, can be created very quickly. They can also be created quickly for each of a large group of items. The first uniform hash function h1 and the second uniform hashing function h2 are pairwise independent. Such a fast, nearly uniform hashing method is extremely useful in, for example, database optimizers, which need to be able to determine the cardinality of a large group of items, such as items in a database table.

As will also be described, such uniform hash functions can be used for a number of other applications where a uniform hash proves valuable. One such application lies in the field of encryption and data security, where a fast, nearly uniform hash function can be used to generate message digests for data to be transmitted electronically.

In accordance with the purpose of the invention, as embodied and broadly described herein, the invention relates to a method of determining a pair of hash functions, by a data processing system having a memory, comprising the steps of: choosing four 32-bit random values; determining two pairwise independent hash values, in accordance with the four 32-bit random values and a 32-bit value x, using only linear arithmetic and 4-byte machine register operations.

In further accordance with the purpose of the invention, as embodied and broadly described herein, the invention relates to a method of determining a number of unique values in a large number of data items stored in a memory of a data processing system, the method comprising the steps of: providing in the memory a linear bitmap of a first predetermined size and a second plurality of bitmaps of a second predetermined size; creating, using only linear arithmetic and 4-byte machine register operations, a first uniform hashing function h1 and a second uniform hashing function h2, which are pairwise independent; using h1 to update the first bitmap; using h2 to update the second plurality of bitmaps; determining a first cardinality from the linear bitmap; if the cardinality is less than or equal to a predetermined number, deeming the first cardinality to be the number of unique items; and if the cardinality is greater than the predetermined number, determining a second cardinality in accordance with the plurality of bitmaps and deeming the second cardinality to be the number of unique items.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 3(b) is a flow chart showing a second preferred method of determining column cardinality.

FIG. 4(b) is a diagram of multiple columns in a table of a relational database and bitmap tables used in conjunction with two fast, nearly uniform hash functions to determine the cardinality of the columns.

FIG. 6 is a table summarizing a Probalistic Counting with Stochastic Averaging (PCSA) technique incorporated in a preferred embodiment of the present invention.

FIG. 7 is a table of key distributions.

FIG. 8 is a table summarizing certain test results associated with a preferred embodiment of the present invention.

FIGS. 9 and 10 are tables summarizing certain test results associated with at least one preferred embodiment of the present invention.

FIG. 11 is a table summarizing standard errors for certain sample tests.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

I. General Background

Figure 1:
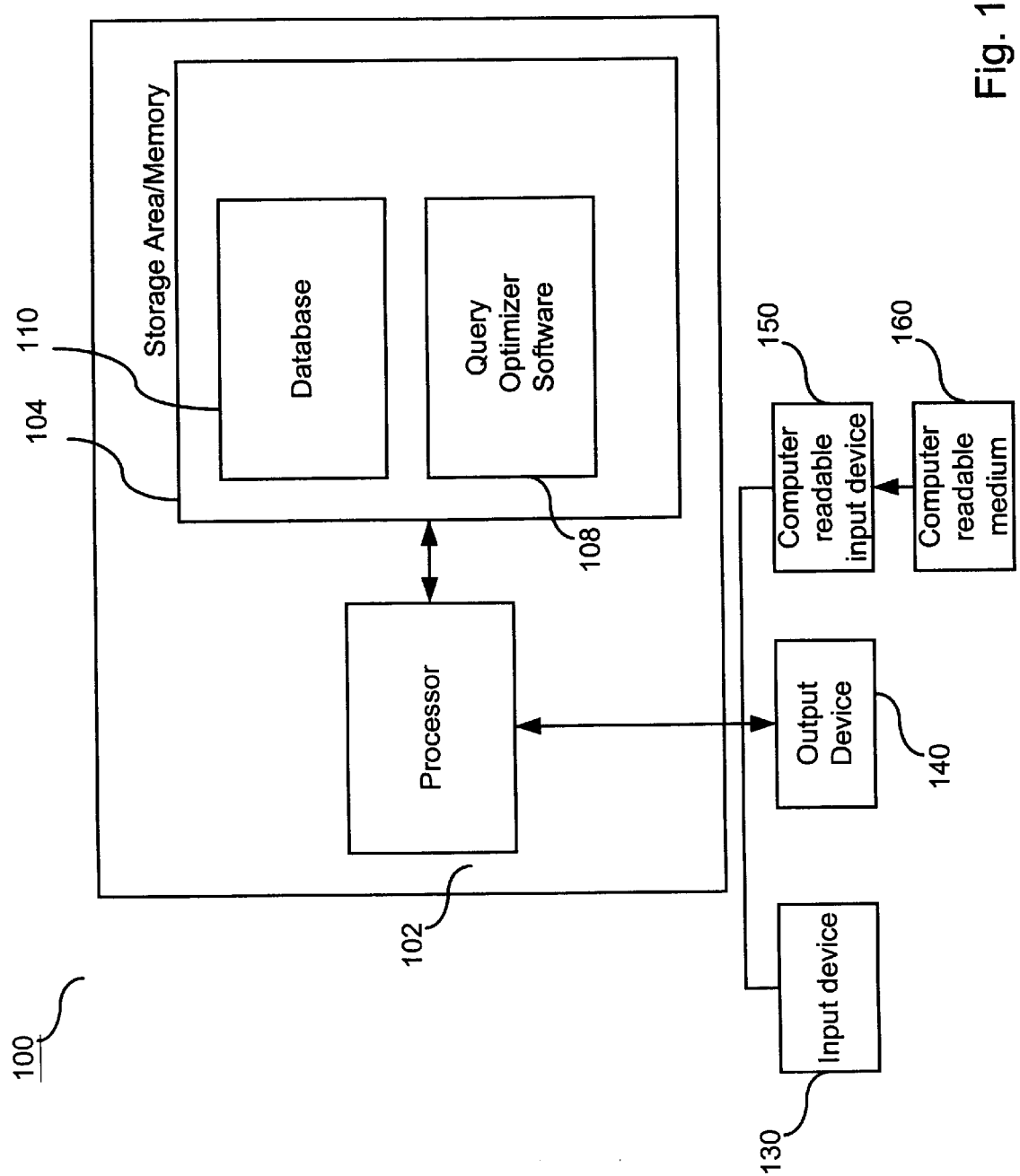
FIG. 1 is a block diagram of a data processing system in accordance with a preferred embodiment of the present invention.

FIG. 1 is a block diagram of a data processing system 100 in accordance with a preferred embodiment of the present invention. In FIG. 1, data processing system 100 includes a processor 102 and a storage area (such as a memory) 104. Storage area 104 includes a database 110, including relational tables, and query optimizer software 108.

In a preferred embodiment of the present invention, query optimizer 108 is a Tandem SQL/MP optimizer, available from Tandem Computers, Inc. of Cupertino, Calif. As will be understood by a person of ordinary skill in the database art, one of the functions performed by query optimizer 108 is to determine the cardinality of one or more columns in a relational database table, either singly (i.e., the cardinality of a single column) or in data blocks or data cubes (i.e., the cardinality of groups of columns).

System 100 includes an input device 130, such as a keyboard, a touchpad, or a mouse that receives input from a user. System 100 also includes an output device 140, such as a display screen, a printer, etc. that outputs information to the user.

A person of ordinary skill in the art will understand that system 100 may also contain additional information, such as input/output lines; input devices, such as a keyboard, a mouse, and a voice input device; and display devices, such as a display terminal. System 100 may also may include application programs, operating systems, data, etc., which are not shown in the figure for the sake of clarity. It also will be understood that system 100 can also include numerous elements not shown, such as disk drives, keyboards, display devices, network connections, additional memory, additional CPUs, LANs, input/output lines, etc.

Specifically, if the described embodiment of the present invention is performed for several partitions of a database table, as described below, computer system 100 may include multiple processors 102 each executing in parallel the method of the present invention. Alternately, if a method in accordance with the described embodiment of the present invention is performed for several partitions of a database table, computer system 100 may include multiple computer systems communicating over a network (or having some appropriate distributed organization), where each of the multiple computer systems has one or more processors.

In the following discussion, it will be understood that the steps of methods and flow charts discussed preferably are performed by processor 102 (or other appropriate processor (s)) executing instructions stored in storage area 104 (or other appropriate memories). Specifically, the instructions are a part of the query optimizer software 110. It will also be understood that the invention is not limited to any particular implementation or programming technique and that the invention may be implemented using any appropriate techniques for implementing the functionality described herein. The invention is not limited to any particular programming language or operating system.

System 100 can also include a computer readable medium input device 150, which reads a computer readable medium 160. The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions of query optimizer 108 may initially be carried on a magnetic disk or a tape. The instructions are loaded into memory 104. Alternately, instructions can be sent over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

Some or all of the instructions and data structures in memory 104 may be read into memory from computer-readable medium 160. Execution of sequences of instructions contained in main memory causes one or more processors to perform the process steps described herein. In alternative embodiments, hard-wired circuitry may be used in place of or in combination with software instructions to implement the invention. Thus, preferred embodiments of the invention are not limited to any specific combination of hardware circuitry and software.

Figure 2:
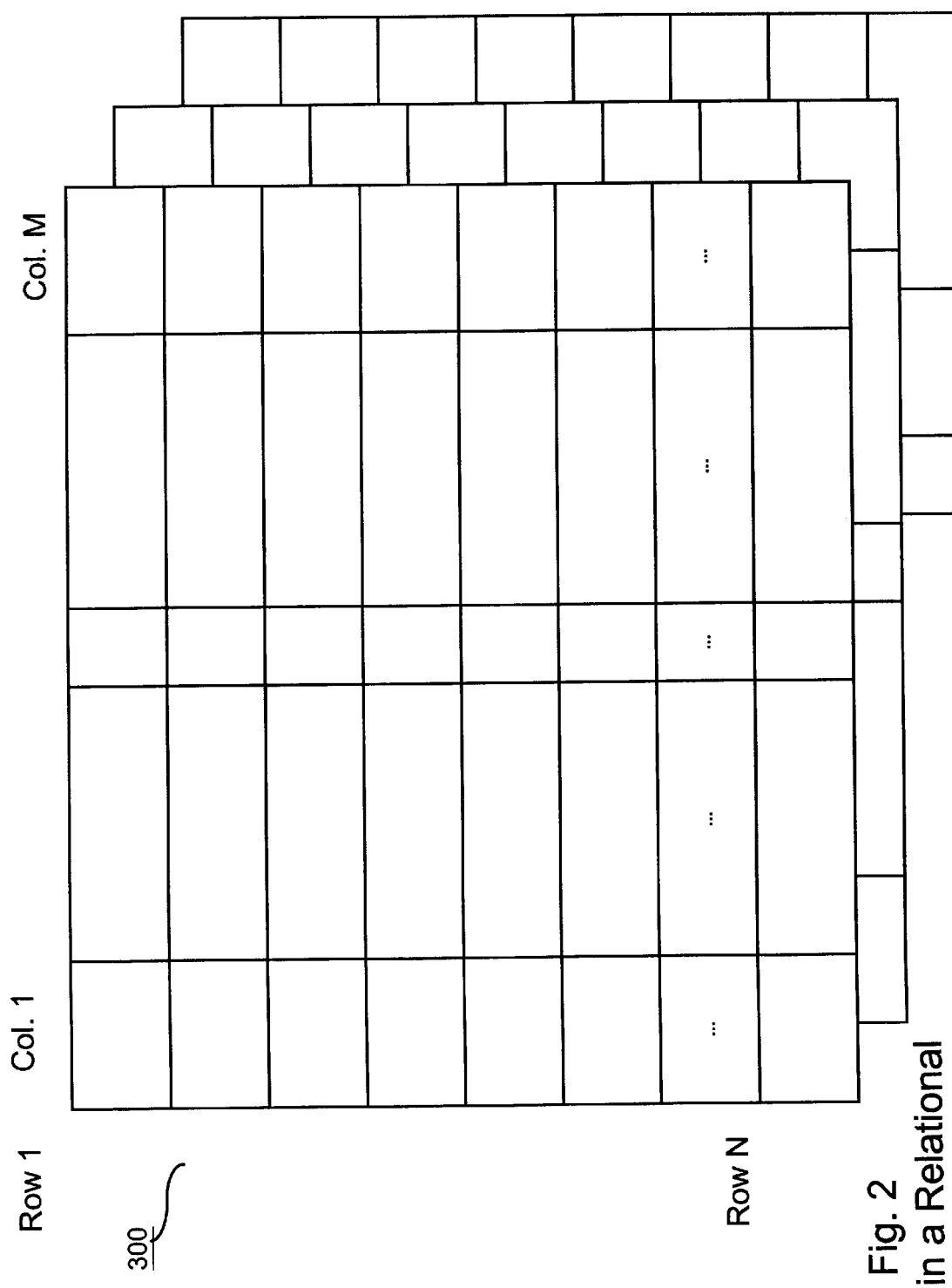
FIG. 2 shows an example of a relational database, having multiple tables, each table having rows and columns, in a memory of FIG. 1.

FIG. 2 shows an example of a relational database 200 in a memory of FIG. 1. As an example, a first table 202 in the relational database has N rows and M columns. As shown, other tables in the database may be of other sizes.

Figure 3A:
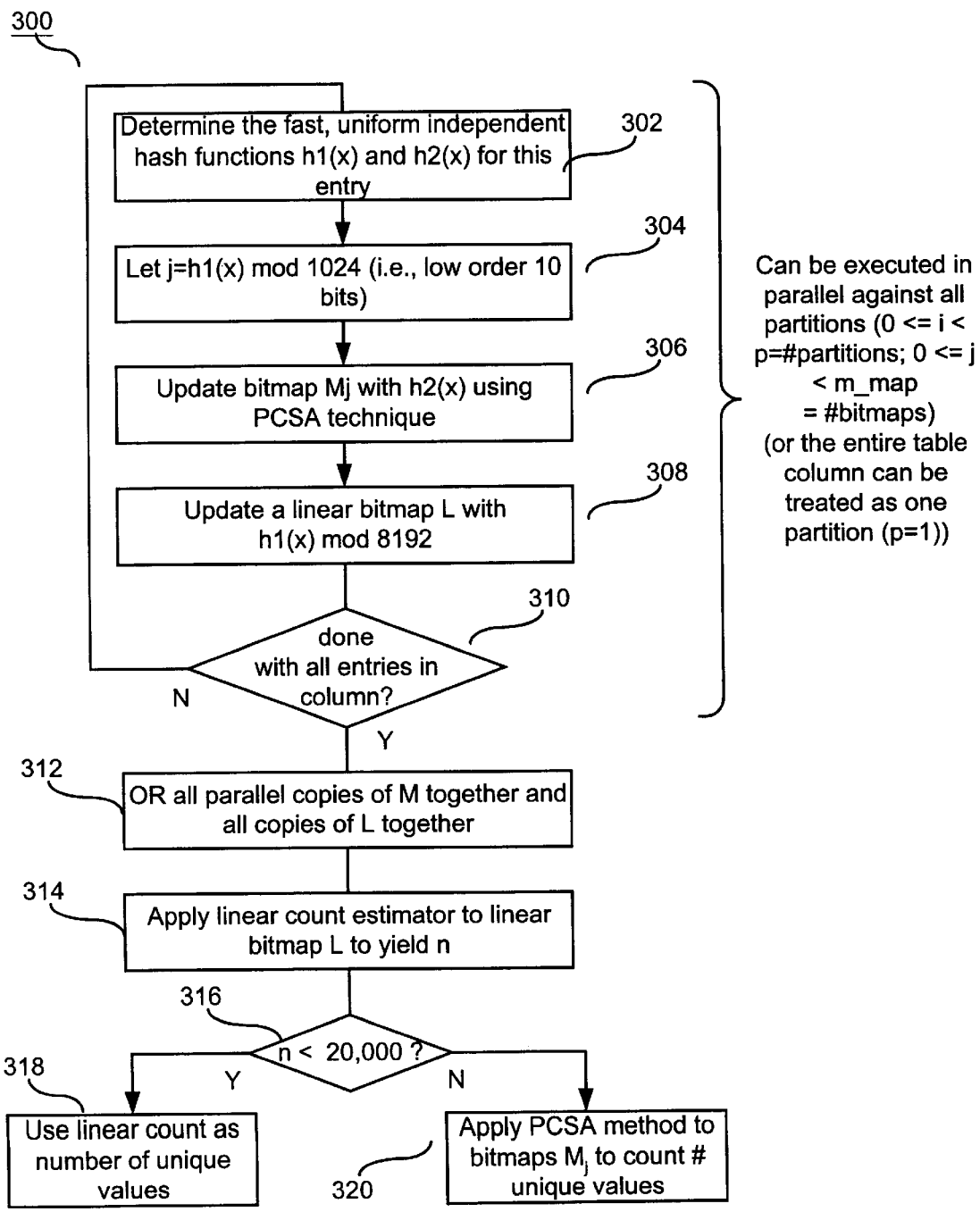
FIG. 3(a) is a flow chart showing a method of determining column cardinality using a first preferred embodiment of the present invention.

FIGS. 3(a) and 3(b) are flow charts showing two versions of a probabilistic counting method for determining a cardinality of a column in a relational database table using a preferred embodiment of the present invention. In general, the methods of FIGS. 3(a) and 3(b) determine a number of unique values in a large number of items. In the described embodiment, the method of FIG. 3 can be used to determine a number of unique values in a column of a relational database table (i.e., the cardinality of the column).

For example, when optimizer 108 is preparing to perform a "join" operation on two tables in a relational database, it is extremely helpful if the optimizer can determine the number of unique values in each table, without having to take the time to tabulate each element in the table. The optimizer may perform the join operation differently, depending on the relative magnitude of the tables.

Figure 4A:
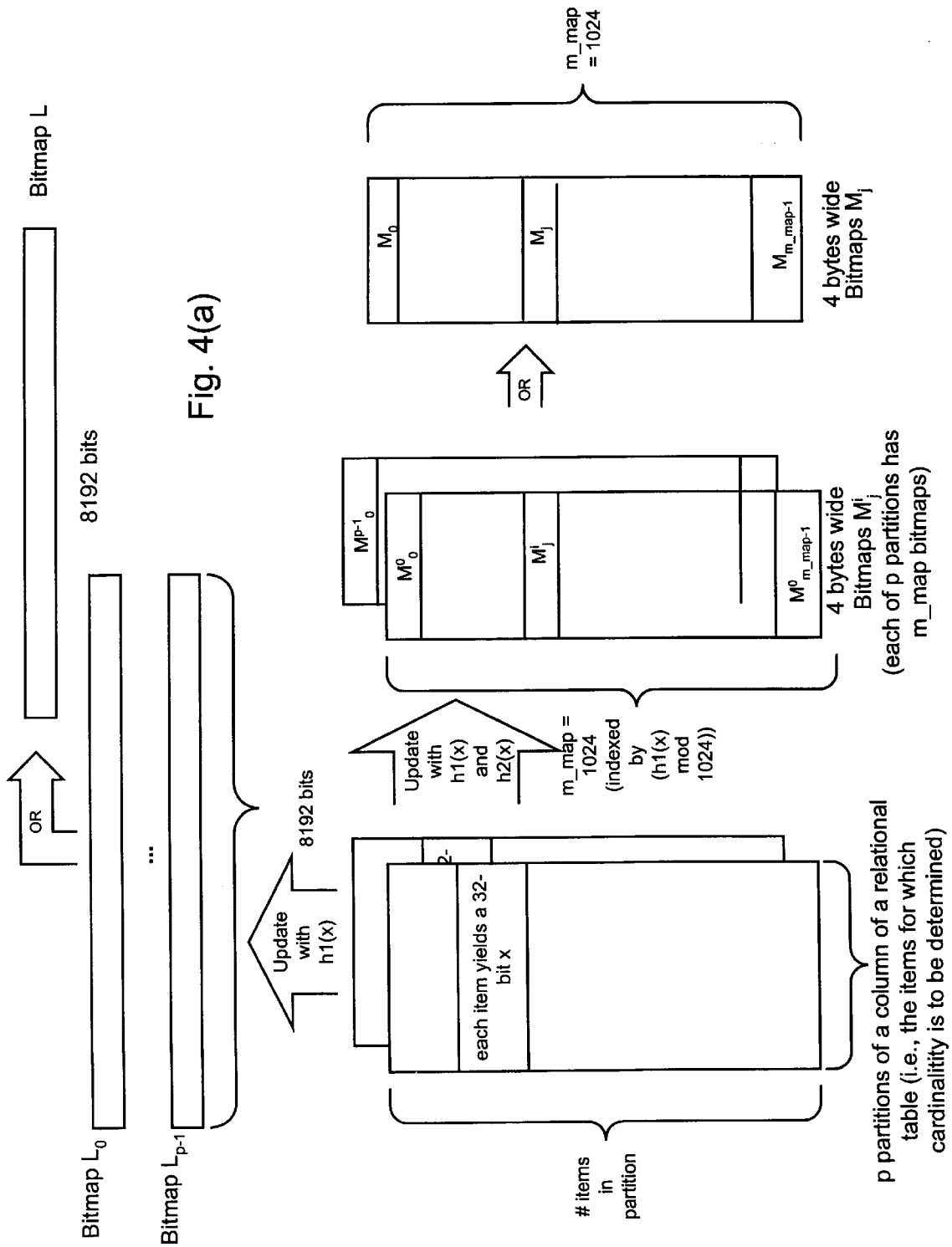
FIG. 4(a) is a diagram of a column in a table of a relational database and bitmap tables used in conjunction with two fast, nearly uniform hash functions to determine the cardinality of the column.
Figure 5:
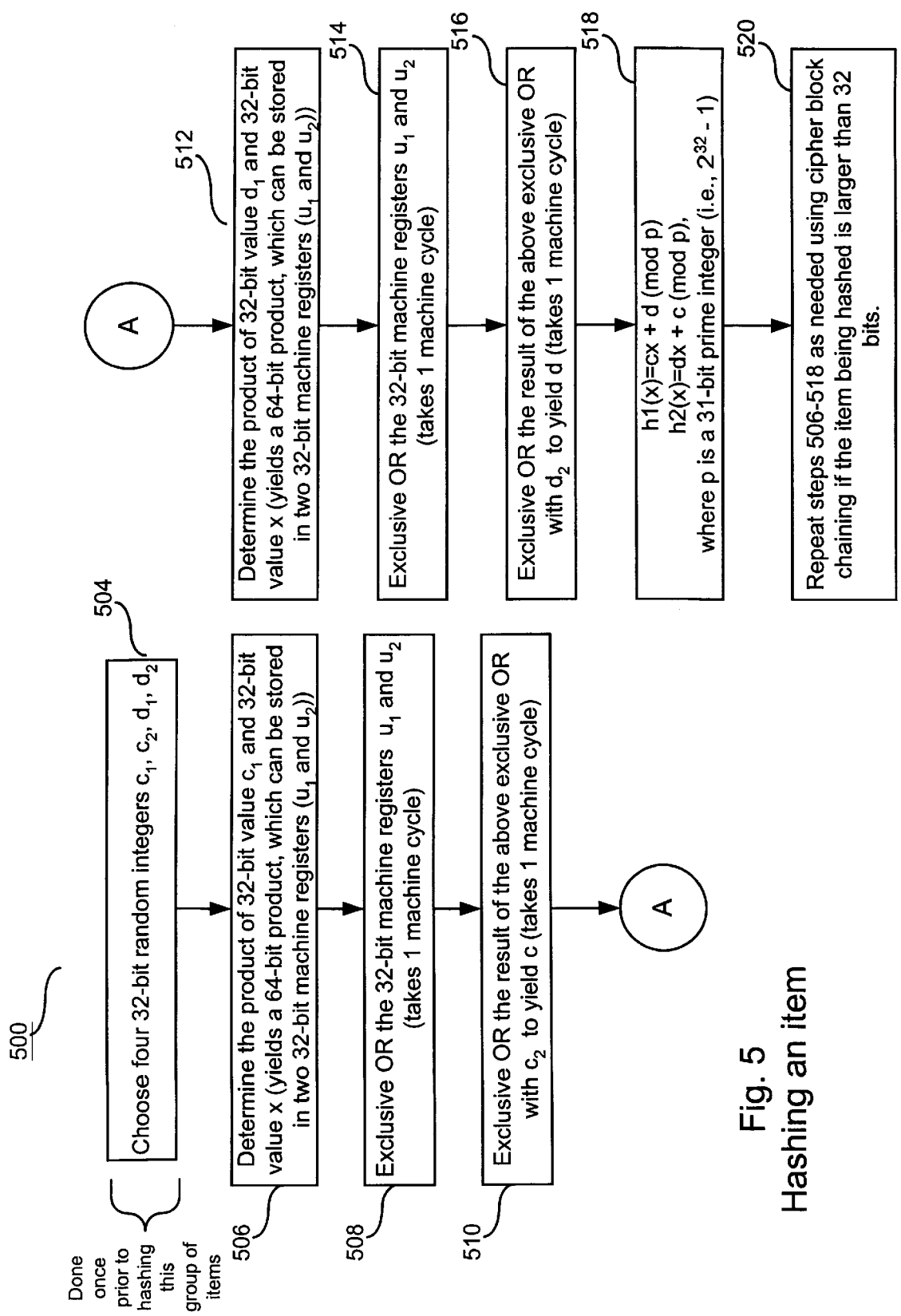
FIG. 5 is a flow chart showing a method for hashing an item in a group of items.

FIGS. 4(a) and 4(b) are diagrams of a method using a fast, nearly uniform hash function for determining a cardinality of one or more columns of a table in a relational database. FIGS. 4(a) and 4(b) also show bitmaps (stored in memory 104) used in this method. FIG. 5 is a flow chart showing a method of hashing an item in a group of items. FIGS. 3–5 will be discussed in detail below in connection with a preferred embodiment of the invention.

II. Probabilistic Counting Methods

Methods for probabilistic counting transform the input via hashing into a uniform distribution, and infer the cardinality from a count of events which occur with predictable frequency under this assumption. All these methods are input distribution independent, as all copies of a particular key map to a single hash value.

Define:

$X=\{x_1, \ldots x_n\}$=distinct input keys h: $X \rightarrow 2^s$=hash function mapping X into s-bit integers (or strings of 0's and 1's)

h: $X \rightarrow m$=hash function from X to $\{1, \ldots, m\}$

IYI=cardinality of Y for any set Y $h(Y)=\{j:j<2^s$ and $h(x)=j$ for some $x \in Y\}$ prob(E)=probability of an event E bitmap=M=any sequence of bits used to record hashing events m=IMI=size of bitmap $\alpha$=load factor, i.e., IXI/m std. error=(standard error)=standard deviation of an estimate relative to its expected value (sometimes expressed as a percentage or "coefficient of variation")

We always assume that h(X) is uniform, i.e., $prob(h(x)=i)=prob(h(x)=j)=2^{-s}$ for any x, i, j A. Linear Counting In conventional systems, such as the system of Whang, for load factors <10, the total number of collisions is circumscribed by a very small variance, and so one can infer IXI from the number v of 0-bits in a bitmap of size m, in which $M_i=1$ iff $h(x)=i$ forsome $x \in X$ using the estimator $n=m-ln(v/m)$.

(See, e.g., Whang et al, "A Linear-Time Probabilistic Counting Algorithm for Database Applications," ACM Transactions on DataBase Systems, Vol. 15, No. 2, June 1990, pp. 208–229 and Astrahan, Schnolnick and Whang, "Approximating the Number of Unique Values of an Attribute Without Sorting Information Systems," Vol. 12, No. 1, 1987, pp. 11–15, each of which is herein incorporated by reference).

In particular, the expected number of 0-bits is $E(v)=m \ exp(-\alpha)$.

For example, if m items are hashed uniformly onto a map of size m, m/e bits should remain 0.

Although requiring space linear in n=IXI, the theoretical standard error is quite small, particularly for large maps:

std. error=$(\sqrt{m} \ (exp(\alpha)-\alpha-1)^{1/2})/n$

For example, for a map of size 10,000:

| Load factor | Standard error |
| --- | --- |
| .25 | .007378 |
| .50 | .007713 |
| .75 | .008077 |
| 1.0 | .008475 |
| 2.0 | .010475 |
| 3.0 | .013369 |
| 4.0 | .017606 |
| 5.0 | .023267 |

Needless to say, with a load factor>1, there is a non-zero probability of the map 'filling up', i.e., all bits=1. An especially useful analysis shows that for a constant load factor, the distribution of v, the number of 0 bits, is asymptotically Poisson, with parameter $\lambda$=expected value of v, so that $prob(v=0)=exp(-\lambda)$.

If all bits were=1 the calculation would be repeated with a new hash function. (In particular, for a map size of 8192 we can 'count' up to 20,000 items with a std. error of <1.28% with a probability of filling the map of exp (−713), which is negligible.)

B. Probabilistic Counting

Using m_map bitmaps with distinct hash functions, the value of $\sigma_R$ can be is reduced via averaging by a factor of $\sqrt{m\_map}$. This would entail n.m_map hash operations, however. If it were possible to divide the input into m_map sets of equal cardinality, one could estimate R=log2($\phi$.n/m_map) with the same reduction in std. deviation, with minimal hashing.

Accordingly a preferred embodiment of the invention uses a technique called PCSA (Probabilistic Counting with Stochastic Averaging), utilizing a single hash function:

Let h(x)=j $j_{mod}$=j (mod m_map), $j_{map}=\lfloor j/m\_map \rfloor$, where m_map bitmaps are enumerated as $M^1, \ldots, M^{m\_map}$. $M^{jmod}$ is chosen uniformly from the low order bits of the hash value, and updated with the remaining bits ($j_{map}$). This process is proven to give increased accuracy equivalent to multiple hash functions.

The following discussion gives all arguments directly via analysis, and leaves unstated the specific invocation of the central limit theory which assures normality of the sampling distribution, so the following detail is included here for completeness:

Theorem: Let X be a random variable with mean=$\mu$ and std. deviation=$\sigma$. Let g be a function of the mean of samples of size m (from the dist. of X) such that g is differentiable in a neighborhood about $\mu$ with g'($\mu$) non-zero.

Then for large m, g is asymptotically normally distributed with mean g(m) and variance $[\sigma \cdot g'(\mu)^2]/m$.

An application of the above theorem agrees with the standard error or relative std. deviation of $0.78/\sqrt{m\_map}$ derived analytically.

If $R = \Sigma R_i / m\_map$, $\sigma_R = 1.12127$, $g(R) = (m\_map/\phi) \, 2^R$ (the estimate of n)

then $g'(R) = (m\_map/\phi) \cdot \ln 2 \cdot 2^R$ and $\sigma g(R) = \sigma_R \cdot g'(E(R))/\sqrt{m\_map} = (0.777/\check{O}m\_map) \cdot n$.

(This is only approximate, as the variance is increased slightly by the fluctuations induced by hashing.)

The bias, i.e., the ratio of the expected estimate to the true count, decreases with m_map, and is approximated by 0.31/m_map. (An appropriate correction factor is incorporated in the calculation.)

FIG. 6 summarizes the benefits of the PCSA incorporated into the described embodiment of the present invention. (In particular, using 1024 bitmaps, we can assure a negligible bias and a probability of 10% error of approximately $1/32353 = \text{Prob}(|X-\mu| > 4.27.\sigma)$ for normally distributed X with mean d and std. deviation $\sigma$.)

The asymptotic results on which the foregoing table is based take effect when n/m_map>10–20, and provided s>log2 (n)+3, i.e., the hash values must exceed the number of bits required to represent n by 4.

Since the bitmap updates merely involve the OR operation to record 'rare' hash values observed, PCSA is totally parallelizable. That is, K sets of m_map bitmaps from disjoint sets can be OR'd to produce m_map values $R_i$, to be averaged for aggregate cardinality estimates.

III. Unique Entry Counts In SQL/MP

The accuracy of the PCSA method employed in the described embodiment of the present invention, using 1024 bitmaps and linear counting for 1–20,000 distinct items using 8192 bits implies that a composite technique, will be accurate throughout the entire range. Specifically, if given two 30-bit hash functions:

$h_1, h_2: X \rightarrow 2^{30}$ a procedure might be:

(1) compute $h_1(x)$ and $h_2(x)$ (2) let $j = h_1(x)$ mod 1024 (i.e., low order 10 bits)

(3) update Mj with $h_2(x)$ (4) update a linear map L with $h_1(x)$ mod 8192

(5) summarize by applying the linear count estimator whenever the calculated n<20,000, and PCSA otherwise This procedure can be executed in parallel against all partitions, with each instance requiring:

4·1024+1024=5k bytes per column.

As mentioned above, OR'ing parallel versions of each Mj, and L, the resulting estimate will be accurate within 10% (usually <2.4%) with high probability, provided $n < 2^{36}$, since our total hash value is 40 bits. Given a maximum of 1024 2GB partitions, with minimum row size of 16 bytes, this limit is acceptable.

The process can of course be added to the load execution, and in DSS (Decision Support Systems) where entire partitions are loaded and deleted, the comments regarding parallelism imply that accurate re-execution of the summary function remains feasible.

FIGS. 3(a) and 3(b) are flow charts showing two versions of a method using a preferred embodiment of the present invention. Step 302 determines pairwise independent hash functions h1 and h2. As discussed below, these hash functions are re-determined for each entry in the group of items whose cardinality is being counted. Thus, it is highly desirable that these hash functions be determined in as efficient a manner as possible, using as few processor cycles as possible.

In step 304, the hash function hi is used to index into one of bitmaps $M_j$ for the current column (or partition). In step 306, the bitmap $M_j$ is updated using a known PCSA technique and hash function h2(x). Step 308 updates a linear bitmap L with h1(x) mod 8192. Step 310 loops to step 302 until all entries in the column have been considered. Step 312 ORs all parallel copies of $M_j$ together to yield m_map bitmaps $M_j$, and ORs all parallel copies of bitmap Li together to yield L. Step 314 applies a linear count estimator to linear bitmap L to yield n. If, in step 316, n<20,000, the method uses the linear count as the cardinality. Otherwise, the method applies the known PCSA technique.

FIG. 3(b) shows additional steps 330–334. If, after step 314, the number of unique values will be very small, the larger of two linear bitmaps L0 and L1 is used in step 314. If the value is small, but greater than the square root of the mapsize m_map, then the mean of all linear bitmaps is used for L.

FIGS. 4(a) and 4(b) are diagrams of a method using a fast, nearly uniform hash function for determining a cardinality of one or more columns of a table in a relational database. FIG. 4(a) shows p partitions of a column of a relational table. It is possible that a column may not be broken into partitions, in which case, p=1. FIG. 4(a) also shows p group of m_map 4-byte bitmaps $m_j^i$ (where $0 \leq i < p = $# partitions and $0 \leq j < m\_map = $# entries in bitmap) and one group of m_map 4-byte bitmaps $m_j$. Additionally, FIG. 4 shows p bitmaps Li (where $o \leq i < p = $# partitions).

FIG. 4(b) shows that the method of FIG. 4(a) can also be performed for various combinations of columns in the database table. In FIG. 4(a), two columns are considered as a group when creating a 32-bit x value. This allows consideration of the cardinality of combinations of columns.

IV. Histograms for SQL/ARK

Assuming histograms are desired by percentile, one could require 100 times the memory used for UEC, i.e., 500 kb/col., which is nevertheless quite reasonable. If most tables generate 10 or fewer histograms, 5 mb/table is a relatively modest main memory utilization, and so a single parallel scan will be adequate.

Unlike UEC, sampling for partitioning keys can be quite efficient. For example sample size calculations can be derived from the application of Chernoff-Hoeffding bounds on tail probabilities of the binomial distribution (see Seshadri and Naughton, following Plaxton, et al. (Seshadri et al, "Sampling Issues in parallel Database Systems," Proc. $3^{rd}$ International Conference on Extending Database Technology—EDBT, (Springer-Verlag, 1992), pp. 328–343 and Blelloch et al., "A Comparison of Sorting Algorithms for the Connection Machine CM-2," Proc. Of the Symposium of Parallel Algorithms and Architectures, July 1995, pp. 3–16, each of which is herein incorporated by reference).

If s=ratio of largest partition to its expected value k=number of processors p=desired probability of error>s then n items sampled randomly per processor will suffice, where $$n=[2.In(k/p)]/[(1-1/s)^2 \cdot s]$$

(This calculation is designed to produce minimum parallel sample elapsed time, but unequal partitions are susceptible to analogous calculations). For example, for sixteen processors, with a desired maximum excess ratio of 1.05, with probability 0.99 (p=0.01), the sample size per CPU would be 6197, approx. 66 sec. More elaborate formulas can produce tighter bounds with decreased samples.

(There is an added requirement when multiple estimates are derived from a single random sample, but the computation, although straightforward, will not be given here.) In addition, a sequential scan ('skip sequential') algorithm, as described in Vitter, "Optimum Algorithms for Two Random Sampling Problems," Proc. $24^{th}$ Annual Symposium on the Foundations of Computer Science (IEEE) November 1983, pp. 56–64, which in herein incorporated by reference, can be used for producing more efficient database random samples.

The implementation of the hashing/counting solution suggested for UEC is invoked with pointers to a key and set of bitmaps, so no modification is required to the C code for ARK histograms. It might be advantageous to reduce the number of PCSA maps in some cases.

V. Uniform Hash Functions

A. Introduction

Strictly speaking, a concise totally uniform hash function is theoretically impossible, as the Kolmogorov complexity of a random function implies that it must have the same length as the input, (See Siegel et al. "Closed Hashing is Computable and Optimally Randomizable With Universal Has Functions," TR86, Courant Institute of Mathematical Sciences, New York University, 1995., which is herein incorporated by reference). A considerable volume of research has therefore been devoted to characterizing properties of the uniform-distribution which can be preserved.

Universal hashing, as described in (Carter et al., "Universal Classes of Hash Functions," Journal of Computer and System Sciences 18 (1979), pp. 143–154 and Carter et al. "New Hash Functions and Their Use in Authentication and Set Equality," Journal of Computer and System Sciences 22 (1982) pp. 265–279, which is herein incorporated by reference) arose as a means of insuring near-uniform behavior on arbitrary input vs. the data dependence of prior work. A class H of functions is Universal-k if:

i) $h: X \to S$, $X=\{1, \ldots, n=2^I\}$ for all $h \in H$ ii) Prob(h(x)=y)=1/ISI for any x, y, i.e., the number of functions colliding at y is uniform iii) For every $x_1, x_2, \ldots, x_k \in X$, $y_1, y_2, \ldots, y_k \in S$, any $h \in H$, Prob($h(x_i)=y_i$ for i=I, \ldots, k) $=1/ISI^k$ As further terminology, let:

$S=\{0, 1, 2, \ldots, s-1\}$ $B_i=\{x \in X: h(x)=i<s\}$=hash buckets $b_i=IB_iI$=bucket sizes $x \oplus y = x$ XOR y xIIy=x concatenated with y $X_{Km}$=set of keys $\{k, II \ldots IIk_m: k_j \in X\}$ (similar to $X^m$)

Property (iii) is related to statistical independence (k-independence); a totally uniform function would be n-independent. Sometimes (iii) is termed strongly-universal. The universal-2 pairwise independence has been exploited to prove deep results in complexity theory, including perfect hashing (See Fredman, "Storing a Sparse Table with O(1) Worst Case Access Time," Journal of the ACM, Vol. 31, No. 3, July 1984, pp. 538–544, which is herein incorporated by reference), the inclusion of probabilistic computation in the polynomial-time hierarchy, and the augmentation of randomness in algorithms (See Wigderson, "Lectures on the Fusion Method and Derandomization," TR SOCS-95.2, McGill University, School of Computer Science 1994, which is herein incorporated by reference).

The most widely-studied universal class is that of polynomials of degree (k–I) over the field of integers modulo a prime, i.e.

$H_p^k$ (or just $H^k$) with members $$h(x)=S\{a_i x^i: 0 \leq i \leq k\} \pmod{p} \mod s = ISI$$

where coefficients $a_i$ are randomly selected from $\{1, 2, \ldots, p\}$, and p>s is any prime>n. These functions are k-independent and (as a consequence) preserve the expected values of the k-th central moments of the uniform distribution of the hash bucket sizes. (The mean is the first central moment, variance the second; 'skewness' and 'kurtosis' refer to the third and fourth). The value p can be selected as a prime equal to $2^r-1$ for some r, as modular arithmetic is easily implemented without division in such eases, see Carter et al. cited above.

It has been proved that linear and quadratic polynomials have large buckets with substantially higher than uniform probability (See Dietzfelbinger et al. "Polynomial Hash Functions are Reliable," International Colloquium on Automata, Languages and programming—ICALP 92, (Spring-Verlag 1992), pp. 235–246 and Dietzfelbinger et al., "A New Universal Class of Hash Functions and Dynamic Hashing in Real Time," International Colloquium on Automata, Languages and programming—ICALP 90," pp. 6–19, each of which is herein incorporated by reference). Tests reported in the next section confirm that only a cubic or equivalent can match the theoretical standard errors of probabilistic counting. Flajolet tested linear multiplicative hash functions against long ascii strings, but worst-case results occur for linearly/numerically related input—as obtain with many TPC-D integer keys—e.g. (1, 2, \ldots, n}.

B. Long Keys

Regarding long keys, it should be obvious that XOR'ing can reduce the cardinality and vitiate the count. For example:

i) Suppose the input consists of 8-byte ascii numeric data. If we reduce to a fullword prior to hashing by XOR'ing both 4-byte strings, the universe is reduced from $10^8$ to 32767.

ii) If we define $g(k_1 IIk_2)=h(k_1) \oplus h(k_2)$, then $$g(k_1 IIk_2)=g(k_2 IIk_1),$$

and the cardinality is potentially reduced by half.

We adopt therefore in all comparisons, tests and definitions below the following chaining technique:

g: $X_{km} \to S_r$.

h: X—X hash function $h_o$: X→S projection onto S, i.e., modular or division

Define for a key $k = x_1 \text{II} \ldots \text{I} \, x_m$ $h_1(k) = h(x_1)$ $h_{j+1}(k) = h(x_{j+1} \oplus h_j(k))$ for $j < m$ $g(k) = h_o(h_m(k))$ In other words, we shall always form the j-th argument to a hash function by XOR'ing with the hash value of the initial j−1 arguments.

C. A Universal Hash Function

Universal hashing is usually implemented by selecting at random a member of a class H, either once for all, or upon successive executions. This does not guarantee correct behavior except as averaged over all possible runs. For complex applications, notably perfect hashing and distributed memory simulation, multiple/iterated functions or higher degree polynomials have been suggested.

Suppose we were given an oracle—a subroutine with infinite computational resources—which, upon the commencement of each run, could select at random for each key a different member of H, and recall this function whenever required. By the definition of universe class, the output would be uniform in all cases. As a practical expedient, one might adopt a fast quasi-random selection of a linear function and achieve both uniformity and high performance.

Define $X = \{0, 1, \ldots, 2^{32}-1\}$—32-bit integers $p = 2^{31}-1$—Thus, p is a 31-bit prime number $Z_p$ = field of integers modulo p $H^2 = \{h: h = ax+b \pmod{p} \text{ for some } a, b < p\}$ $c_1, c_2, d_1, d_2 \in X$—For example, $c_1, c_2, d_1, d_2$ are 32-bit random numbers $x \in X$ $(u_1 \text{II} \, u_2) = c_1 x$—the 64-bit product $g(c_1, x) = u_1 \oplus u_2$ $c = g(c_1, x) \oplus c_2 \pmod{p}$ $d = g(d_1, x) \oplus d_2 \pmod{p}$ $h_1(x, c_1, c_2, d_1, d_2) = cx + d \pmod{p}$ $h_2(x, c_1, c_2, d_1, d_2) = dx + c \pmod{p}$ $H = \{h_{c1,c2,d1,d2}: h(x) = h_1(x, c_1, c_2, d_1, d_2) \text{ for } x \in X\}$ Then $h_1$ and $h_2$ are, for each x, 'random' members of $H^2$, with several performance advantages:

i) Modular arithmetic for $p = 2^{31}-1$ can be accomplished with bit manipulations without division. (As a further optimization one can omit a test for 0 (mod p) with no effect, with probability $1 - 1/p$.)

ii) If $x \equiv y \pmod{p}$ for $x \neq y \in X$, different functions (i.e., c,d pairs) will be selected with high probability. Thus we can avoid processing data in 3-byte increments (elements of the field) (as in conventional systems); and avoid dealing with fullwords (as in conventional systems), and still utilize $Z_p$ hashing.

iii) Two cubic polynomial functions (as used in conventional systems) for an 8-byte key would require a total of 30 (modular) multiply operations and 18 (modular) additions, while the above uses 8 and 4 respectively. Fix a key $x \in X$. Several basic properties are easily established:

(1) All members of H are selected with equal probability.
Proof:
To select $cx+d$ set $c_2 = g(c_1, x) \oplus c$ and $d_2 = g(d_1, x) \oplus d$
These are unique for each pair $(c_1, d_1)$ (2) The functions $h_1$ and $h_2$ above are pairwise independent. I.e., for any $i, j < p$, $Prob(h_1(x)=i \text{ and } h_2(x)=j) = 1/p^2$ Proof:
The pair of linear equations in $Z_p$ $cx + d = i$ $dx + c = j$ has a unique solution in c and d for any i and j.

(3) The preceding applies as well to the functions $h_o(h_1(x)) = h_1(x) \bmod s$, and $h_o(h_2(x)) = h_2(x) \bmod s$ for any $s < p$.

Proof:
Suppose $i_0, j_0 < s$
There are $\lfloor p/s \rfloor i \equiv i_0 \bmod s$ in $Z_p$ and similarly for $j_0$. Since each pairing occurs with probability $1/p^2$, the probability that $h_1(x) \equiv h_2(x) \pmod{s}$ is $(1/p^2)(\lfloor p/s \rfloor)^2 \leq 1/s^2$.

Note that if $h_1$ and $h_2$ were to map onto tables of size $s_1$ and $s_2$ the same argument would hold. This implies that for double hashing applications such as PCSA, recursive joins, etc. the pair of function values can be used as if $h_1$ and $h_2$ had been selected independently amid uniformly from H, using 8 random coefficients.

The behavior of the function g–XOR'ing both halves of the 64-bit product of 32-bit integers—is less than uniform, but statistical studies indicate that the number of distinct values is not far from the expected p/e. (The 'large' buckets constitute a small fraction.) In any case, independent applications for both coefficients make significant (if any) duplication of $h_1$ for distinct x,y unlikely. Note that even if for some subset X' of an input X all keys selected a single h, this would be a random linear function in $Z_p$—and such functions have worst-case input in an arithmetical series (cf. result of Dietzfelbinger mentioned above).

What is required to rigorously verify test results which show the preceding function to have uniformity at least equivalent to a cubic polynomial in $Z_p$—i.e., strictly better than a quadratic—is some notion of quasi-independence (Siegel et al. "Chernoff-Hoeffding Bounds for Applications With Limited Independence," TR 92-1305, Dept. of Computer Science, Cornell University, October 1992, which is herein incorporated by reference). Most likely the function class is 'almost'-k-independent for some k, $4 \leq k \leq 32 = \log 2$ (n), but studies are ongoing. (Degrees of freedom and bitwise linear independence are two rationales under consideration.)

FIG. 5 is a flow chart showing a method for hashing an item in a group of items. In the probabilistic counting method of FIG. 3, these steps (except for step 504) are performed for each entry in the table. Step 504 initially chooses four 32-bit random integers c1, c2, d1, and d2. These same four random integers are preferably used throughout the hashing method.

Step 506 determines the product of the 32-bit value c1 and the 32-bit value x to yield a 64-bit product. To aid in efficiency and speed of the method, this 64 bit product is stored in two 32-bit machine registers (u1 and u2). These machine registers are preferably a part of data processing system 100 of FIG. 1. Step 508 exclusive OR's u1 and u2. Step 510 exclusive OR's the result of step 508 with 32-bit value c2 to yield a 32-bit value c. Note that the XOR steps normally takes only one machine cycle apiece.

Step 512 determines the product of the 32-bit value d1 and the 32-bit value x to yield a 64-bit product. To aid in efficiency and speed of the method, this 64 bit product is stored in two 32-bit machine registers (u1 and u2). Step 514 exclusive OR's u1 and u2. Step 516 exclusive OR's the result of step 514 with 32-bit value d2 to yield a 32-bit value d. Note that the XOR steps normally takes only one machine cycle apiece.

Step 518 uses c (from step 510) and d (from step 516) to determine two pairwise independent hash functions as follows:

$$h1(x)=cx+d \ (mod \ p)$$

$$h2(x)=dx+c \ (mod \ p),$$

where p is a 31-bit prime integer, as discussed above. Note that d and c need only be determined once to yield two hash functions. Step 518 indicates that, if the item being hashed is larger than 32 bits, it may be necessary to repeat steps 506–518 using the known cipher block chaining technique, in which successive portions of the item x are hashed and exclusive OR'ed with the previous hash value.

VI. Hash Function Tests

Detailed confirmation for probabilistic counting will be deferred until the next section. We present here a description of the methodology used in hashing per se, as well as data set definitions.

For long keys, using the chaining method described above, let:

$$h: X \to S \ \{0, 1, \ldots, 2^{32}-1\} \supseteq X, S \ |X|=n$$

$$h_0: X_{km} \to S'=\{0, \ldots, u-1\}=h(k) \ mod \ u$$

The familiar $\chi^2$-test for uniformity with u−1 degrees of freedom is:

$$\Sigma\{(b_i-[n/u])^2 : i<u\}/(n/u)$$

i.e., the sum of squared deviations from the expected value divided by the expected value. The statistic is normally distributed, and thus a probability of a uniform distribution giving a higher value can be computed. With the programming facilities of the SAS language, one can construct a test as follows:

(1) Apply the given hash function to a dataset, producing 30-bit values (2) For a list of integers $(u_1, \ldots, u_v)$ compute all hash values (mod $u_j$) and tabulate the $\chi^2$-probability with $u_j-1$ degrees of freedom.

(3) Examine the output probabilities for a sufficiently large sample and determine obvious rejections.

For example, SAS outputs p=1 for a statistic with prob $(1-10^{-10})$; any such value or, say 0.99999 in 1000 tests, would be a rejection, as would a non-uniform distribution of output probabilities in the intervals (0,0.1], (0.1,0.2], ..., (0.8,0.9].

It was precisely such tests (96 integers per dataset per run) that occasioned the construction of the preceding universal hash function, as none of the random or fixed linear multiplicative functions could 'pass' all the input distributions in the following table. The given function produces $\chi^2$-values expected from a uniform distribution, provided a sufficient number of runs is used to sample a variety of random coefficient vectors.

FIG. 7 shows thirteen key distributions; in addition, other diverse integer sequences were used at various times.

VII. Double Hashing

Double hashing is asymptotically optimal in the number of probes over a hash table of size s (s prime):

$$\text{i-th probe in sequence}=(h)x)+(i-1).g)x))$$

for uniform functions h,g. The optimal number of probes for loading the αN-th item is approximately $1/(1-\alpha)$. Both the recommended function and a cubic polynomial as well as a random generator achieved the optimal distribution of probe counts over the loading of entire tables, or with load 0.9, with keys $\{1, \ldots, n\}$.

Similarly, several calculations of higher moments of hash bucket totals revealed no differences. These tests would require redesign to provide definitive information, and were abandoned in favor of more detail in probabilistic counting measurements.

VIII. Counting Tests

A. Requirements of Probabilistic Counting

Probabilistic counting is one of the more demanding applications, as can be seen easily by considering fixed-coefficient multiplicative functions in common use (Knuth, "The Art of Computer Programming," Vol. 3, Sorting and Searching, (Reading, Mass. Addison-Wesley, 1977), which is herein incorporated by reference.

If $$g(x)=ax(mod \ 2^{32}),$$

$$h(x)=[g(x)/2^{32}].m.$$

Using a recommended coefficient, such as a=3,109,568,659, with input $$X=\{1, 2, \ldots, n\}$$

the resulting hash buckets are almost identical in size, a useful attribute in searching symbol tables. However, the number of 0's in a bitmap of size m is much too small, resulting in an over-estimate of n=19000 from Whang's estimator of 300% for m=8192 as recommended above. PCSA errors of at least 30% (on 1M keys from dataset T1) were detected and this class of functions was not considered further.

Since the implemented universal hash function is randomized, repeated trials for a single key distribution should vary, achieving the predicted bias and standard error for a sufficiently large sample, and indeed the results agree precisely with both the theoretical estimates. Further tests with random polynomials over the field $Z_p$ indicate that Whang's estimator in particular is an excellent measure of uniformity: Both linear and quadratic classes fail to duplicate the std. error, while the cubics do not differ detectably from the implemented method.

Three sets of tests were conducted: 1) 35 distributions with cardinalities 500–3 billion, with at least 50 iterations per test, i.e., 50 independent vectors of random coefficients $(c_1,c_2,d_1,d_2)$—referred to as N_test below; 2) to estimate more accurately the agreement with Flajolet's analytical derivations of bias and std. error, 17 tests with N_test=5000, with cardinalities 53795—100 M; 3) a series of comparative runs together with random polynomial hash functions of degree ≦3, involving linear counting with various map sizes. FIG. 8 briefly summarizes (1) and (2) in tabular form, where std. error is represented as a percentage, as well as absolute difference between the mean estimate and actual cardinality:

Note that for the more voluminous tests, the mean standard error agrees exactly with the theoretical prediction, viz.

2.4 for 1024 bitmaps. In addition, 'Err' is reduced by an order of magnitude, converging with large samples to 0, which should be the case with a bias correction; as a relative factor in estimation it is negligible.

Details are shown in FIGS. 9 and 10.

As a timing aside, the 100M integer counts complete in approximately 115 sec. on a MIPS R4400 processor.

IX. Linear Counting vs. Polynomial Hash Functions

If H refers to the class of universal hash functions defined above, let polynomial classes be denoted:

$$H^d = \{h: h\Sigma\{a_i x^i : i<d\}, a_i < p = 2^{31}-1\}$$

That is, $H^d$ is the class of polynomials over the field $Z_p$ of degree d−1, and each test consists of a linear count using Whang's estimator over a particular mapsize, with random coefficients.

With linear functions (d=2), errors of up to 1000% were detected, and the standard errors were too large to justify lengthy comparisons. FIG. 11 summarizes standard errors for large sample tests of random members of H vs. $H^3$ and $H^4$, as well as the theoretical prediction:

Since linear counting with these mapsizes is exceptionally accurate, these figures serve mainly to discriminate quadratic from cubic functions with respect to uniformity—a 50% increase in std. error could entail more severe discrepancies in other contexts. In addition, this provides evidence that the best known hash techniques of comparable accuracy to members of H are substantially slower.

X. Limitations of Sampling for UEC

A. General

Bunge and Fitzpatrick, in an exhaustive scholarly review ("Estimating the Number of Species: A Review," Journal of the American Statistical Association," Vol. 88, No. 421, March 1993, pp. 364–372, which is herein incorporated by reference) that referenced hundreds of documents and communications, concluded: "the problem is quite resistant to statistical solution, essentially because no matter how many classes have been observed, there may still be a large number of very small unobserved classes". In addition, if a small sample contains numerous singletons—classes with one representative in the sample—some statistical model of the population must be used to extrapolate the number of small classes of size 1,2,3, etc. which these represent. For many such models an effective technique exists, and there is always the possibility of extensive database workload characterization identifying the appropriate distribution. However, it is noteworthy that Bunge et al.s' own study of the problem ("Sampling to Estimate the Number of Duplicates in a Database," Computational Statistics and Data Analysis 11, 1991, pp. 65–74, which is herein incorporated by reference)) resulted in a sequential scan:

i) sample the database, selecting n distinct items;

ii) scan the database, counting the exact totals for each sampled class;

iii) multiply the population size by the inverse of the estimated mean items/class The proposed estimator is not more accurate than probabilistic counting.

B. Space Complexity

All methods discussed herein are based on an estimate of the number C of classes in a population of N items, based on a sample of size n, using $c=(c_1, c_2, \ldots, c_n)$ where $c_i$=number of classes with i sample representatives.

Unfortunately most statisticians have dealt with this unique species question in zoology/taxonomy, numismatics or linguistics, where C is quite small as compared with the number of distinct key values for 5–10 columns of a terabyte database. Consider the memory requirement for a 20% sample of $2^{32}$ rows with very conservative assumptions:

i) 5–10 columns yielding on average one unique value overall per row;

ii) data length=8 bytes for all columns (We could use a 64 bit hash value, which would be close to 1—1 so this isn't totally unreasonable.) Adding 4 bytes for a tree or other search structure pointer, and 4 bytes per counter per sample key, total memory requirement would be 12.8 GB. This omits replication of distinct values across processors/partitions. In addition to added space requirements, this poses the problem of combining the counts from the final samples if one wishes to parallelize the process.

One can easily conceive of large databases with many classes, for which a 20% sample would not be efficient with current technology.

One Proposal

In addition to ignoring the space complexity, a number of issues were overlooked in the study of Seshadri, et al. ([26]). Based on empirical data taken from three databases, these authors suggest a composite estimator, based on a uniformity test from the sample:

(i) a somewhat novel variation when the hypothesis of equal class sizes is validated, and (ii) an estimator due to Shlosser for all other cases. This distinction was treated by Bunge and Fitzpatrick, but their comments regarding (ii) are significant:

". . . Shlosser did not calculate the bias or variance of this estimator, but it performed reasonably well in his simulations for sampling fractions as low as 10%. Thus a biased estimator . . . outperforms the UMVUE in this case, although there has been no formal comparison, and Shlosser's simulations were not extensive."

The authors used as a validation statistic the "mean absolute deviation" or "MAD". For their 24 non-uniform columns, the Shlosser estimator had, for a sampling fraction of 20%, a MAD of 13.6%, with maximum of 49.2%. The equivalent of the std. error (for an unbiased estimator) was 'consistently 4%–6% higher'. Thus our 'guarantee' confidence limit for, say, 4.16s, as in section II, would be approximately 74.4%. However, the probability inference (1/32353) only holds for the exponentially decreasing tails of the normal sampling distribution, which hasn't been established for Shlosser's estimator. A general inequality (e.g. Chebychev) would merely give (1/17). (Without additional assumptions, Markov's inequality would give Prob (error<74.4%)<1/5.)

Shlosser's estimator was tested on variants of the presumably common distributions consisting of several large classes together with numerous small classes, using 17 distribution types, 131 in all. Cardinalities ranged from 10k–1M, and measurements included exponential, geometric (as in [24]), mixtures of uniform intervals, etc. The overall average error per type was 37.6%, max 81.1% and min 0.01%, worst single case 97%. These were exclusively 20% samples; 10% sample errors were often double. This suggests that more diverse attribute structures may behave unexpectedly.

It seems unlikely that a reliable 10% maximum error can be achieved within common main memory limits with the proposed sampling technique.

XI. Enhancement to Linear Counting

A. Augmented Accuracy for 'Very Small' Counts

FIG. 3(b) shows a method in accordance with a second preferred embodiment of the present invention. For cardinalities n<(mapsize)$^{1/2}$ a uniform hash function has a probability >1/2 of being 1—1, i.e. having no collisions. Although Whang's standard error approximations are accurate, the normal distribution underestimates the probability of relative errors. For example, using an approximate binomial (Bernoulli trials) model, a cardinality of 10 will have at least one collision (and a relative error of 10%) with a probability of 0.0055 or about 1/182, although this represents 12.8 σ.

As proven above, the two functions used to implement PCSA are pairwise independent. If the hash values are applied to separate maps, the probability of error for 'very small' counts can be squared by simply using the larger estimate—with no performance impact.

For n>(mapsize)$^{1/2}$ one can use the mean of two 0-bit counts and reduce the std. error throughout the remainder of the range by a factor of the square root of 2.

Specifically, let $h_1$, $h_2$=independent hash functions m=size of bitmap (8192)

$v_1$, $v_2$=fraction of 0 bits using $h_1$ and $h_2$, respectively n=cardinality to be estimated α=load factor=n/m Two well-known approximations of the mean and variance of a function g of a random variable x are:

$$E(g(x)) \sim g(\mu_x) + g''(\mu_x)\sigma^2_x/2 \text{ and}$$

$$var(g(x)) \sim (g+('_x)\sigma_x)^2$$

If $$x = v = \text{fraction of 0 bits in bitmap}$$

and $$g(v) = -m\log(v) = \text{estimator of } n$$

and recalling Whang's derivation $$\mu_v = exp(-\alpha)$$

$$\sigma_v^2 = exp(-\alpha)(1-(1+\alpha)exp(-\alpha))/m$$

this gives:

$$g'(v) = -m/v$$

$$g'(\mu_v)^2 \sigma_v^2 = (m/exp(-\alpha)^2)[exp(-\alpha)(1-(1+\alpha)exp(-\alpha))/m]$$

$$= m(exp(\alpha) - \alpha - 1)$$

$$= \text{variance of estimator}$$

and $$g''(\mu_v)\sigma_v^2/2 = (m/exp(-\alpha))^2[exp(-\alpha)(1-(1+\alpha)exp(-\alpha))/m]$$

$$= (exp(\alpha) - \alpha - 1)/2$$

= estimated bias in Whang et al. "A Linear-Time Probabilistic Counting Algorithm for Database Applications"

(These general approximations are derived from the Taylor series truncation justified by Whang.) If $v_1$ and $v_2$ are identically normally distributed, their mean is normal with variance reduced by a factor of 2. By the above formulas we conclude that the bias of the estimator $g((v_1+v_2)/2)$ should be reduced by a factor of √2, and the standard deviation (hence standard error) reduced by a factor of √2.

Such an estimator utilizes 2k bytes of storage (2 8192-bitmaps), and can be compared with a single 16384-bit map as follows:

1) for very small counts the former is substantially more accurate;
2) for larger counts, the latter has smaller std. error.

We deem 2) less significant, as PCSA will be selected for all cardinalities >20,000.

The following tables give crude inverse probabilities of collision for very small counts and standard errors—i.e. relative standard deviation expressed as a percent—for larger counts <20,000.

| Cardinalities | Probabilities of Collision | | |
|---|---|---|---|
| | m = 8192 | (2) m = 8192 | m = 16384 |
| 2 | 8192 | 6,710,864 | 16384 |
| 10 | 182 | 33,205 | 364 |
| 32 | 16 | 275 | 33 |
| 64 | 4 | 17 | 8 |
| 90 | 2 | 4 | 4 |

| Cardinalities | Standard Errors | | |
|---|---|---|---|
| | m = 8192 | (2) m = 8192 | m = 16384 |
| 150 | .784 | .554 | .553 |
| 1500 | .806 | .570 | .561 |
| 7500 | .921 | .651 | .598 |
| 15,000 | 1.11 | .788 | .651 |
| 20,000 | 1.28 | .908 | .692 |

To illustrate, 825,730 sample counts of a 10-element column (from the SQL/MP optimizer test database) were executed with 26 counts of 9, i.e. 1/31,759, which is statistically indistinguishable (p=0.44) from the above inverse probability for 2 8k bitmaps.

A second sample of 273,968 counts (i.e. from distinct hash coefficients) was taken for a cardinality of n=15,000. The theoretical calculations give:

$$\mu_v = exp(-\alpha) = .160244708 = \text{expected 0-bit fraction}$$

$$\sigma_{g(v)}/n = (m(exp(\alpha) - \alpha - 1)/2)^{1/2}/n$$

$$= .0078782244 = \text{std. error}$$

$$\mu_{g(v)} = n + ((exp(\alpha) - \alpha - 1)/2)/2$$

$$= 15000.85 = \text{expected estimate } (n + \text{bias})$$

The sample observed standard error was 0.0078777867, with mean 0-bit count=0.1602280 mean count=15001.71 an apparent discrepancy. The approximation used by Whang, $$exp(-a) \sim (1-1/m)^n = 0.16022656,$$

introduced a slight inaccuracy, and substituting the exact value, $$\mu_{g(v)} = -m \cdot \log(.16022656) + ((exp(\alpha) - \alpha - 1)/2)/2$$

$$= 15001.768$$

The sample values are in fact statistically indistinguishable with any plausible confidence limit from the more precise calculations, and achieve the predicted improvement over a single 8k bitmap.

Normal Distribution of Linear Count Estimator

The fraction of 0's—v—is asymptotically normally distributed for a fixed α (=n/m) as n,m approach infinity (See Whang et al "A Linear-Time Probabilistic Counting Algorithm for Database Applications"). However, to assign a probability to multiples of the standard error one must derive some distribution of the estimator itself. It will be sufficient to argue that the random variable v is asymptotically lognormal, i.e., having a normally distributed logarithm, ignoring the constant multiplier (−m) in the definition of g(v) above.

The notation $\Lambda(\mu, \sigma^2)$ is used in Johnson et al., "Continuous Univariate Distributions (New York; John Wiley & Sons. Second edition) vol. 1, ch 14, and Aitchison et al. "The Lognormal Distribution (Cambridge University Press, 1957, chapter 2, each of which is which is herein incorporated by reference, to denote a distribution whose logarithm is $N(\mu, \sigma^2)$, i.e. normal with mean m and variance $\sigma^2$. As $\sigma^2$ approaches 0, the lognormal skewness vanishes and the distribution is indistinguishable from normality. In fact, the possibility of substituting a suitable lognormal for any normal variate. If the coefficient of variation (=variance of log) is sufficiently small and the logarithm is defined, the normal random variable will also be close to lognormal. Using the preceding approximations, $$var(g(v))=m(exp(\alpha)-\alpha-1)$$

hence $$var(log(v))=var(g(v))/m^2=(exp(\alpha)-\alpha-1)/m$$

For a fixed load factor α, as n, m approaches infinity, this quantity decreases to 0, and the distribution of v is asymptotically lognormal.

For example, the coefficient of variation of v $$\sigma_v/\mu_v = [\exp(-\alpha)(1-(1+\alpha)\exp(-\alpha))/m]^{1/2}/\exp(-\alpha)$$

$$= [(\exp(\alpha)-\alpha-1)/m]^{1/2}$$

is equal to the standard deviation of log(v) as approximated above. If we conduct test simulations of any normal distribution using the SAS statistical language, the D-statistic normality test furnished will always indicate a normal logarithm if the c.v.<~0.83%. For the estimator of linear counting, this would require, for n=15,000 a map size of approx. 3 8192. I.e., for a=15,000/8192 the asymptotic normality would reach statistical significance if both factors were tripled. However, for the 15,000 element test related above, the actual distributions were approximately normal, with median, 75-th, 90-th, 95-th and 99-th percentiles exactly as predicted from the normal φ function. The coefficients of skewness and kurtosis (which measure departures from normality) are close to 0 and the rate of convergence should not be an issue in error predictions for the range n=500–20,000 with two maps of size m=8192.

The following tabulates the inverse probabilities for multiples of the standard error of 0.788% for a cardinality of 15,000 using two 8k linear bitmaps. Included are the expected and observed frequencies from the above sample.

| Error (%) | Inv. Prob. | Frequency | Sample |
|---|---|---|---|
| 0.5 | 1.90 | 144,193.7 | 144,056 |
| 1.0 | 4.89 | 56,026.2 | 56,081 |
| 1.5 | 17.55 | 15,610.7 | 15,614 |
| 2.0 | 89.7 | 3054.3 | 3131 |
| 2.5 | 661.9 | 413.9 | 438 |
| 3.0 | 7112.3 | 38.5 | 37 |
| 3.5 | 112,004.3 | 2.45 | 3 |

While the invention has been described in conjunction with a specific embodiment, it is evident that many alternatives, modifications and variations will be apparent to those skilled in the art in light of the foregoing description. For example, the functions h1 and h2 can be augmented cryptographically by the "cooperative distributive" technique of Salomaa, producing a strong message digest hash value. Accordingly, it is intended to embrace all such alternatives, modifications and variations as fall within the spirit and scope of the appended claims and equivalents.

TABLE 1

| m_map | Bias | Std. Eror (%) |
|---|---|---|
| 2 | 1.1662 | 61.0 |
| 4 | 1.0792 | 40.9 |
| 8 | 1.0386 | 28.2 |
| 16 | 1.0191 | 19.6 |
| 32 | 1.0095 | 13.8 |
| 64 | 1.0047 | 9.7 |
| 128 | 1.0023 | 6.8 |
| 256 | 1.0011 | 4.8 |
| 512 | 1.0005 | 3.4 |
| 1024 | 1.0003 | 2.4 |

TABLE 2

| Dataset | N | length | Descriptions |
|---|---|---|---|
| T1 | 1M | 66 | 3 random ascii words from /usr/dict (22 bytes 1-justified) |
| T1 | 1M | 15 | 3 random ascii 5-digit strings |
| T2 | 100k | 24 | strings of ascii letters chosen with very unequal probabilities |
| T3 | 100k | 4 | random 32-bit binary ints |
| T5 | 53795 | 8 | workload address trace - ascii |
| T6 | 53795 | 4 | address trace - binary |
| T7 | 100k | 16 | random packed decimal with leading zeroes |
| T8 | 100k–3 billion | 4 | binary integers 1-n |
| T10 | 100k | 20 | ascii 0's & 1's -uniform dist. |
| T11 | 100k | 12 | similar to T2 with leading blanks |
| T12 | 100k | 24 | heavily biased (unequal prob.) ascii digits |
| T18 | 100k | 8 | ascii digits 900k–1M w/leading 0 |
| T19 | 100k | 80 | random bits - 1 bit per fullword |

TABLE 3

| Type (N_tst) | N (Dist.) | Mean Std. Error | Min Std. Error | Max Std. Error | Mean Err (%) | Min Err | Max Err |
|---|---|---|---|---|---|---|---|
| Lin 50 | 16 | .933 | .599 | 1.47 | .127 | .004 | .25 |
| PC 50 | 19 | 2.32 | 1.16 | 2.83 | .278 | .03 | .672 |
| PC 5k | 17 | 2.398 | 2.34 | 2.49 | .033 | 6.4E-4 | .08 |

TABLE 4

| Dataset | Keylen | Distinct | Std. Err (%) | Err (%) | N_test |
|---|---|---|---|---|---|
| T10 | 20 | 95423 | 2.83 | .672 | 50 |
| T12 | 24 | 95227 | 2.36 | .214 | 50 |
| T2 | 12 | 100000 | 2.17 | .156 | 50 |
| T2 | 12 | 100000 | 2.76 | .423 | 50 |
| T1 | 36 | 99977 | 2.44 | .137 | 50 |
| T1 | 8 | 99800 | 2.38 | .389 | 50 |
| T1 | 15 | 1M | 2.51 | .433 | 50 |
| T7 | 12 | 63225 | 1.97 | .062 | 50 |
| T8 | 4 | 100000 | 1.90 | .615 | 50 |
| T9 | 4 | 63125 | 2.73 | .326 | 50 |
| T11 | 10 | 99983 | 2.33 | .390 | 50 |
| T14 | 4 | 100000 | 2.53 | .238 | 50 |
| T1 | 66 | 1M | 2.10 | .547 | 50 |
| T5 | 8 | 53795 | 2.34 | .202 | 50 |
| T6 | 4 | 53795 | 2.58 | .065 | 50 |
| T3 | 4 | 99999 | 2.49 | .034 | 50 |
| T2 | 12 | 100000 | 2.29 | .218 | 50 |
| T14 | 4 | 500 | .599 | .092 | 50 |
| T12 | 24 | 750 | .753 | .163 | 50 |
| T11 | 10 | 1000 | .881 | .004 | 50 |
| T10 | 20 | 1499 | .700 | .076 | 50 |
| T9 | 4 | 1981 | .832 | .088 | 50 |
| T8 | 4 | 2500 | .714 | .007 | 50 |
| T7 | 12 | 4869 | .653 | .110 | 50 |
| T6 | 4 | 7500 | .844 | .250 | 50 |
| T5 | 8 | 10000 | .913 | .161 | 50 |
| T3 | 4 | 12500 | 1.020 | .184 | 50 |
| T2 | 12 | 15000 | 1.110 | .139 | 50 |
| T1 | 36 | 16000 | .911 | .011 | 50 |
| T1 | 8 | 16994 | 1.21 | .106 | 50 |
| T1 | 66 | 18000 | 1.40 | .092 | 50 |
| T1 | 15 | 19000 | 1.47 | .155 | 50 |
| T1 | 22 | 8303 | .919 | .165 | 50 |
| T1 | 22 | 13788 | 1.16 | .128 | 50 |
| T8 | 4 | 3 billion | 2.30 | .030 | 174 |

TABLE 5

| Dataset | Keylen | Distinct | Std. Err | Err (%) |
|---|---|---|---|---|
| T8 | 4 | 1M | 2.49 | .060 |
| T8 | 4 | 10M | 2.44 | .0077 |
| T14 | 4 | 100000 | 2.38 | .0769 |
| T5 | 8 | 53795 | 2.36 | .0261 |
| T6 | 4 | 53795 | 2.34 | .0046 |
| T7 | 12 | 63225 | 2.41 | .0048 |
| T8 | 4 | 100000 | 2.39 | .0546 |
| T9 | 4 | 63125 | 2.44 | .0364 |
| T2 | 25 | 100000 | 2.34 | .0006 |
| T1 | 36 | 99977 | 2.38 | .0267 |
| T1 | 8 | 99800 | 2.38 | .0184 |
| T12 | 24 | 95226 | 2.45 | .0137 |
| T10 | 20 | 95423 | 2.38 | .0675 |
| T11 | 10 | 99983 | 2.34 | .0421 |
| T1 | 66 | 1M | 2.39 | .0121 |
| T1 | 15 | 1M | 2.43 | .0209 |
| T8 | 4 | 100M | 2.43 | .0800 |
| Mean: | | | 2.398 | .0326 |

TABLE 6

| Distinct | Mapsize | H | $H^3$ | $H^4$ | Predicted | N_test |
|---|---|---|---|---|---|---|
| 19000 | 8192 | 1.255 | 2.08 | 1.239 | 1.247 | 5500 |
| 20000 | 8192 | 1.286 | 2.0337 | 1.294 | 1.284 | 5500 |
| 100,000 | 65536 | .747 | 1.0593 | .742 | .748 | 5000 |

The following documents may be relevant to or provide background for the present invention. Each of the following is herein incorporated by reference.

1. Celis, P. and Shak, D. "Statistics, Predicate Selectivity and Costing." Tandem Computers, NOAH External Specifications, 1996.

2. Harinarayan, V., Rajaraman, A. and Ullman, J. D. "Implementing Data Cubes Efficiently." Proc. 1996 mnt. Conf. on Management of Data—SIGMOD 96, (ACM: June 1996).

3. Astrahan, M. M., Scholnick, M. and Whang K- Y. "Approximating the Number of Unique Values of an Attribute Without Sorting." Information Systems, Vol. 12, No. 1, 1987, pp. 11–15.

4. Flajolet, P. and Martin, G. N. "Probabilistic Counting Algorithms for Data Base Applications." Journal of Computer and System Sciences, Vol. 31, No. 2, October 1985, pp. 182–209.

5. Flajolet, P. and Martin, G. N. "Probabilistic Counting". Proc. 24th Annual Symposium on the Foundations of Computer Science, (IEEE, November 1983), pp. 76–82.

6. Whang, K- Y., Vander-zanden, B. T. and Taylor, H. M. "A Linear-Time Probabilistic Counting Algorithm for Database Applications." ACM Transactions on Database Systems, Vol. 15, No. 2, June 1990, pp. 208–229.

7. Flajolet, P. "On Adaptive Sampling." Computing 34, pp. 391–408.

8. Kirschenhofer, P. and Prodinger, H. "On the Analysis of Probabilistic Counting." Number Theoretic Analysis, LNCS 1452, (Berlin: Springer-Verlag, 1989), pp. 117–120.

9. Wilks, S. S. Mathematical Statistics. (N.Y.: John Wiley & Sons, Inc.), pp. 259–260.

10. Seshadri, S. and Naughton, J. F. "Sampling Issues in Parallel Database Systems." Proc. 3rd International Conference on Extending Database Technology—EDBT 92, (Springer-Verlag, 1992), pp. 328–343.

11. Blelloch, G. E., Leiserson, C. E., Maggs, B. M., Plaxton, C. G., Smith, S. J., and Zagha, M. "A Comparison of Sorting Algorithms for the Connection Machine CM-2." Proc. of the Symposium on Parallel Algorithms and Architectures, July 1995, pp. 3–16.

12. Vitter, J. S. "Optimum Algorithms for Two Random Sampling Problems." Proc. 24th Annual Symposium on the Foundations of Computer Science, (IEEE: November 1983), pp. 56–64.

13. Siegel, A. and Schmidt, J. "Closed Hashing is Computable and Optimally Randomizable with Universal Hash Functions." TR686, Courant Institute of Mathematical Sciences, New York University, 1995.

14. Carter, J. L. and Wegman, M. N. "Universal Classes of Hash Functions." Journal of Computer and System Sciences 18 (1979), pp. 143–154.

15. Carter, J. L. and Wegman, M. N. "New Hash Functions and their Use in Authentication and Set Equality." Journal of Computer and System Sciences 22 (1981), pp. 265–279.

16. Fredman, M. L., Komlos, J. and Szemeredi, E. "Storing a Sparse Table with O(1) Worst Case Access Time." Journal of the ACM, Vol. 31, No. 3, July 1984, pp. 538–544.

17. Wigderson, A. Lectures on the Fusion Method and Derandomization. TR SOCS-95.2. McGill University, School of Computer Science, 1994.

18. Dietzfelbinger, M., Gil, J., Matias, Y., and Pippenger, N. "Polynomial Hash Functions are Reliable." International Colloquium on Automata, Languages and Programming—ICALP 92, (Springer-Verlag, 1992), pp. 235–246.

19. Dietzfelbinger, M. and Meyer-Auf-Der-Heide, F. "A New Universal Class of Hash Functions and Dynamic Hashing in Real Time." International Colloquium on Automata, Languages and Programming—ICALP 90, pp. 6–19.

20. Dietzfelbinger, M., Karlin, A., Melhorn, K., Meyer-Auf-Der-Heide, F., Rohnert, H., and Tarjan, R. E. "Dynamic Perfect Hashing—Upper and Lower Bounds." Proc. 29th IEEE Symposium on the Foundations of Computer Science, 1988, pp. 524–531. (Also TR282, Univ. Dortmund, 1988.)

21. Siegel, A., Schmidt, J., and Srinivasan, A. "Chernoff-Hoeffding Bounds for Applications with Limited Independence." TR 92-1305, Dept. of Computer Science, Cornell University, October 1992.

22. Lueker, G. and Molodowitch, M. "More Analysis of Double Hashing." 20th ACM Symposium on the Theory of Computing, May 1988, pp. 354–359.

23. Knuth, D. E. The Art of Computer Programming, Vol. 3, "Sorting and Searching." (Reading, Mass.: Addison-Wesley, 1977).

24. Bunge, J. and Fitzpatrick, M. "Estimating the Number of Species: A Review." Journal of the American Statistical Association, Vol. 88, No. 421, March 1993, pp. 364–372.

25. Bunge, J. A. and Handley, J. C. "Sampling to Estimate the Number of Duplicates in a Database." Computational Statistics & Data Analysis 11 (1991), pp. 65–74.

26. Haas, P. J., Naughton, J. F., Seshadri, S. and Stokes, L. "Sampling-Based Estimates of the Number of Distinct Values of an Attribute." Proc. 21st VLDB Conference, Zurich 1995, pp. 311–322

27. Papoulis, A. Probability and Statistics. (Englewood Cliffs, N.J.: Prentice Hall, 1990, 1994), Ch. 4.

28. Johnson, N. L., Kotz, S. and Balakrishnan, N. Continuous Univariate Distributions. (New York: John Wiley & Sons, Second Edition), Vol 1, Ch. 14.

29. Aitchison, J. and Brown, J. A. C. The Lognormal Distribution. (Cambridge: Cambridge Univ. Press, 1957), Ch. 2.

What is claimed is:

1. A method of determining a pair of hash values, by a data processing system having a memory, comprising:

choosing four 32-bit random values and storing them in the memory;

determining two hash values from pairwise independent hash functions $h1(x)=cx+d \pmod{p}$ and $h2(x)=dx+c \pmod{p}$, where c=a first 32-bit result value c and where d=a second 32-bit result value d and where p is a prime number, wherein said hash functions are determined in accordance with the four 32-bit random values from the memory and a 32-bit value x also from the memory, using only linear arithmetic and 4-byte machine register operations.

2. The method of claim 1, further comprising:

determining the 32-bit value x for a value that is larger than 32-bits using a cipher block chaining method.

3. The method of claim 1, wherein determining two hash values includes:

determining a product of a first one of the 32-bit random values and the 32-bit value x to yield a 64-bit value, which is stored in two 32-bit machine registers;

exclusive ORing the 32-bit values in the machine registers to yield a result R1 and exclusive ORing the result R1 with a second one of the 32-bit random values to yield the first 32-bit result value c.

4. The method of claim 3, wherein determining two hash values further includes:

determining a product of a third one of the 32-bit random values and the 32-bit value x to yield a 64-bit value, which is stored in two 32-bit machine registers;

exclusive ORing the 32-bit values in the machine registers to yield a result R2; and exclusive ORing the result R2 with a fourth one of the 32-bit random values to yield the second 32-bit result value d.

5. The method of claim 1, further comprising determining a number of unique values in a large number of data items stored in the memory of the data processing system, which includes:

providing in the memory a linear bitmap of a first predetermined size and a second plurality of bitmaps of a second predetermined size;

using a first one of the hash functions to update the first bitmap;

using both hash functions to update the second plurality of bitmaps;

determining a first cardinality from the linear bitmap;

if the cardinality is less than or equal to a predetermined number, deeming the first cardinality to be the number of unique items; and if the cardinality is greater than the predetermined number, determining a second cardinality in accordance with the plurality of bitmaps.

6. A method of determining a number of unique values in a large number of data items stored in a memory of a data processing system, the method comprising:

providing in the memory a linear bitmap of a first predetermined size and a second plurality of bitmaps of a second predetermined size;

creating, using only linear arithmetic and 4-byte machine register operations, a first uniform hashing function h1 and a second uniform hashing function h2, which are pairwise independent;

using a first hash function $h1(x)=cx+d \pmod{p}$ to update the first bitmap;

using a second hash function $h2(x)=dx+c \pmod{p}$ to update the second plurality of bitmaps, where c=a first 32-bit result value c and where d=a second 32-bit result value d and where p is a prime number;

determining a first cardinality from the linear bitmap;

if the cardinality is less than or equal to a predetermined number, deeming the first cardinality to be the number of unique items; and if the cardinality is greater than the predetermined number, determining a second cardinality in accordance with the plurality of bitmaps and deeming the second cardinality to be the number of unique items.

7. The method of claim 6, wherein determining a first cardinality includes determining the first cardinality in accordance with a linear count method.

8. The method of claim 6, wherein determining a second cardinality includes determining the second cardinality in accordance with a probabilistic count method.

9. The method of claim 6, wherein determining a first cardinality includes:

if the cardinality is small, using a larger of a pair of linear bitmap counts; and if the expected cardinality is small but larger than a square root of a bitmap size, using a mean of the plurality of linear bitmaps.

10. The method of claim 6, wherein the items are divided into p partitions and a plurality of bitmaps is stored in memory for each partition p.

11. An apparatus, having a memory and determining a pair of hash values, comprising a processor executing the following software portions:

a software portion configured to choose four 32-bit random values and store them in the memory;

a software portion configured to determine two hash values from pairwise independent hash functions h1(x)=cx+d (mod p) and h2(x)=dx+c (mod p), where c=a first 32-bit result value c and where d=a second 32-bit result value d and where p is a prime number, wherein said hash functions are determined in accordance with the four 32-bit random values from the memory and a 32-bit value x also from the memory, using only linear arithmetic and 4-byte machine register operations.

12. The apparatus of claim 11, in which the software executed by the processor further comprises:

a software portion configured to determine the 32-bit value x for a value that is larger than 32-bits using a cipher block chaining method.

13. The apparatus of claim 11, wherein the software portion executed by the processor and configured to determine two hash values includes:

a software portion configured to determine a product of a first one of the 32-bit random values and the 32-bit value x to yield a 64-bit value, which is stored in two 32-bit machine registers;

a software portion configured to exclusive OR the 32-bit values in the machine registers to yield a result R1; and a software portion configured to exclusive OR the result R1 with a second one of the 32-bit random values to yield the first 32-bit result value c.

14. The apparatus of claim 13, wherein the software portion executed by the processor and configured to determine two hash values further includes:

a software portion configured to determine a product of a third one of the 32-bit random values and the 32-bit value x to yield a 64-bit value, which is stored in two 32-bit machine registers;

a software portion configured to exclusive OR the 32-bit values in the machine registers to yield a result R2; and a software portion configured to exclusive OR the result R2 with a fourth one of the 32-bit random values to yield the second 32-bit result value d.

15. The apparatus of claim 14, wherein the software portion executed by the processor and configured to determine two hash values includes:

a software portion configured to determine the first hash function h1(x)=cx+d (mod p); and a software portion configured to determine the second hash function h2(x)=dx+c (mod p), where c=the first 32-bit result value c and where d=the second 32-bit result value d and where p is a prime number.

16. The apparatus of claim 11, further comprising a software portion executed by the processor and configured to determine a number of unique values in a large number of data items stored in the memory of the data processing system, including:

a software portion configured to provide in the memory a linear bitmap of a first predetermined size and a second plurality of bitmaps of a second predetermined size;

a software portion configured to use the first hash function to update the first bitmap;

a software portion configured to use the second hash function to update the second plurality of bitmaps;

a software portion configured to determine a first cardinality from the linear bitmap;

a software portion configured to, if the cardinality is less than or equal to a predetermined number, deem the first cardinality to be the number of unique items; and a software portion configured to, if the cardinality is greater than the predetermined number, determine a second cardinality in accordance with the plurality of bitmaps.

17. An apparatus having a memory and determining a number of unique values in a large number of data items stored in a memory of a data processing system, the apparatus comprising:

a software portion configured to provide in the memory a linear bitmap of a first predetermined size and a second plurality of bitmaps of a second predetermined size;

a software portion configured to create, using only linear arithmetic and 4-byte machine register operations, a first uniform hashing function h1 and a second uniform hashing function h2, which are pairwise independent;

a software portion configured to use a first hash function h1(x)=cx+d (mod p) to update the first bitmap;

a software portion configured to use a second hash function h2(x)=dx+c (mod p) to update the second plurality of bitmaps, where c=a first 32-bit result value c and where d=a second 32-bit result value d and where p is a prime number;

a software portion configured to determine a first cardinality from the linear bitmap;

a software portion configured to, if the cardinality is less than or equal to a predetermined number, deem the first cardinality to be the number of unique items; and a software portion configured to, if the cardinality is greater than the predetermined number, determine a second cardinality in accordance with the plurality of bitmaps and deem the second cardinality to be the number of unique items.

18. The apparatus of claim 17, wherein the portion configured to determine a first cardinality includes a software portion configured to determine the first cardinality in accordance with a linear count method.

19. The apparatus of claim 17, wherein the portion configured to determine a second cardinality includes a software portion configured to determine the second cardinality in accordance with a probabilistic count method.

20. The apparatus of claim 19, wherein the portion configured to determine a first cardinality includes:

a software portion configured to, if the cardinality is small, use a larger of a pair of linear bitmap counts; and a software portion configured to, if the expected cardinality is small but larger than a square root of a bitmap size, use a mean of the plurality of linear bitmaps.

21. The apparatus of claim 17, wherein the items are divided into p partitions and a plurality of bitmaps are stored in memory for each partition p.

22. A computer program product that determines a pair of hash values, comprising:

a computer readable medium, including program instructions, the program instructions including:

computer program code devices configured to choose four 32-bit random values and store them in a memory;

computer program code devices configured to determine two hash values from pairwise independent hash functions h1(x)=cx+d (mod p) and h2(x)=dx+c (mod p), where c=a first 32-bit result value c and where d=a second 32-bit result value d and where p is a prime number, wherein said hash functions are determined in accordance with the four 32-bit random values from the memory and a 32-bit value x also from the memory, using only linear arithmetic and 4-byte machine register operations.

23. A computer program product that determines a number of unique values in a large number of data items stored in a memory of a data processing system, comprising:

a computer readable medium, including program instructions, the program instructions including:

computer program code devices configured to provide in a memory a linear bitmap of a first predetermined size and a second plurality of bitmaps of a second predetermined size;

computer program code devices configured to create, using only linear arithmetic and 4-byte machine register operations, a first uniform hashing function h1 and a second uniform hashing function h2, which are pairwise independent;

computer program code devices configured to use a first hash function h1(x)=cx+d (mod p) to update the first bitmap;

computer program code devices configured to use a second hash function h2(x)=dx+c (mod p) to update the second plurality of bitmaps, where c=a first 32-bit result value c and where d=a second 32-bit result value d and where p is a prime number;

computer program code devices configured to determine a first cardinality from the linear bitmap;

computer program code devices configured to, if the cardinality is less than or equal to a predetermined number, deem the first cardinality to be the number of unique items; and computer program code devices configured to, if the cardinality is greater than the predetermined number, determine a second cardinality in accordance with the plurality of bitmaps and deem the second cardinality to be the number of unique items.

24. A method of determining a pair of hash functions, by a data processing system having a memory, comprising:

choosing four 32-bit random values and storing them in the memory;

determining two pairwise independent hash functions h1(x)=cx+d (mod p) and h2(x)=dx+c (mod p), where c=a first 32-bit result value c and where d=a second 32-bit result value d and where p is a prime number, wherein said hash functions are determined in accordance with the four 32-bit random values from the memory and a 32-bit value x also from the memory, using only linear arithmetic and 4-byte machine register operations.

25. The method of claim 24, wherein determining hash function h1 includes:

determining a product of a first one of the 32-bit random values and the 32-bit value x to yield a 64-bit value, which is stored in two 32-bit machine registers;

exclusive ORing the 32-bit values in the machine registers to yield a result R1 and exclusive ORing the result R1 with a second one of the 32-bit random values to yield the first 32-bit result value c.

26. The method of claim 25, wherein determining hash function h2 includes:

determining a product of a third one of the 32-bit random values and the 32-bit value x to yield a 64-bit value, which is stored in two 32-bit machine registers;

exclusive ORing the 32-bit values in the machine registers to yield a result R2; and exclusive ORing the result R2 with a fourth one of the 32-bit random values to yield the second 32-bit result value d.

27. The method of claim 26, wherein determining two hash functions h1 and h2 includes:

determining the first hash function h1(x)=cx+d (mod p); and determining the second hash function h2(x)=dx+c (mod p), where c=the first 32-bit result value c and where d=the second 32-bit result value d and where p is a prime number.

* * * * *